(12) United States Patent
Kuwata et al.

(10) Patent No.: US 9,264,587 B2
(45) Date of Patent: Feb. 16, 2016

(54) IMAGE SAVING APPARATUS, IMAGE TRANSFER APPARATUS AND IMAGE TRANSMISSION APPARATUS

(71) Applicant: NIKON CORPORATION, Tokyo (JP)

(72) Inventors: Hiromi Kuwata, Tokyo (JP); Nobuhiro Hayashi, Tokyo (JP); Atsushi Ohori, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 100 days.

(21) Appl. No.: 14/016,473

(22) Filed: Sep. 3, 2013

(65) Prior Publication Data

US 2014/0002678 A1    Jan. 2, 2014

Related U.S. Application Data

(63) Continuation of application No. 13/673,701, filed on Nov. 9, 2012, now abandoned, which is a continuation of application No. 12/382,353, filed on Mar. 13, 2009, now abandoned.

(30) Foreign Application Priority Data

Mar. 18, 2008   (JP) .................................. 2008-069448
Feb. 26, 2009   (JP) .................................. 2009-044307

(51) Int. Cl.
    H04N 5/225    (2006.01)
    H04N 1/00     (2006.01)
    H04N 1/32     (2006.01)

(52) U.S. Cl.
    CPC ........... *H04N 5/225* (2013.01); *H04N 1/00236* (2013.01); *H04N 1/00241* (2013.01);
    (Continued)

(58) Field of Classification Search
    CPC .......... H04N 1/00236; H04N 1/00241; H04N 5/225; H04N 1/32106; H04N 2201/0015; H04N 2201/0049; H04N 2201/0055; H04N 2201/0084; H04N 2201/3226; H04N 2201/325; H04N 2201/3273; H04N 2201/3274; H04N 2201/3278
    USPC ............. 348/333.01, 333.02, 333.11, 333.12, 348/231.2, 231.3, 231.6, 231.9
    See application file for complete search history.

(56) References Cited

U.S. PATENT DOCUMENTS

2002/0030746 A1   3/2002   Shibutani
2005/0283356 A1   12/2005  Wang
(Continued)

FOREIGN PATENT DOCUMENTS

JP    A-11-027627     1/1999
JP    A-2002-094858   3/2002
(Continued)

OTHER PUBLICATIONS

May 10, 2012 Office Action issued in U.S. Appl. No. 12/382,353.
(Continued)

*Primary Examiner* — Twyler Haskins
*Assistant Examiner* — Carramah J Quiett
(74) *Attorney, Agent, or Firm* — Oliff PLC

(57) ABSTRACT

An image transfer system configured with an image transmission apparatus, an image transfer apparatus and the image saving apparatus. The image transmission apparatus transmits image data recorded in a storage medium to the image transfer apparatus. The image transfer apparatus receives the image data, records the image data into a first storage device and transfers the image data to the image saving apparatus in response to a request issued from the image saving apparatus. The image saving apparatus receives the image data and records the image data into a second storage device. The image saving apparatus includes: the second storage device; a communication unit; a recording control unit for controlling read/write of management information; a request receiving unit from a user; a decision-making unit as to whether or not target image data are recorded; an image requesting unit for the target image data; and an image recording unit.

1 Claim, 27 Drawing Sheets

(52) U.S. Cl.
CPC .... *H04N1/32106* (2013.01); *H04N 2201/0015* (2013.01); *H04N 2201/0049* (2013.01); *H04N 2201/0055* (2013.01); *H04N 2201/0084* (2013.01); *H04N 2201/325* (2013.01); *H04N 2201/3226* (2013.01); *H04N 2201/3273* (2013.01); *H04N 2201/3274* (2013.01); *H04N 2201/3278* (2013.01)

(56) References Cited

U.S. PATENT DOCUMENTS

2007/0201864 A1 8/2007 Shinkai et al.
2008/0122950 A1 5/2008 Uchiyama

FOREIGN PATENT DOCUMENTS

| JP | A-2004-048139 | 2/2004 |
| JP | A-2005-051647 | 2/2005 |
| JP | A-2005-142731 | 6/2005 |
| JP | A-2006-080860 | 3/2006 |

OTHER PUBLICATIONS

Mar. 1, 2013 Office Action issued in U.S. Appl. No. 13/673,701.
Jun. 25, 2013 Japanese Office Action issued in Japanese Patent Application No. 2009-044307 (with translation).

FIG.5

| FILE NAME | CAMERA FLAG | WT FLAG |
|---|---|---|
| DSC_0001.JPG | 1 | 1 |
| DSC_0002.JPG | 1 | 0 |
| DSC_0003.JPG | 0 | 1 |
| DSC_0004.JPG | 0 | 0 |
| | | |
| | | |
| | | |
| | | |

IMAGE SAVING APPARATUS, IMAGE TRANSFER APPARATUS AND IMAGE TRANSMISSION APPARATUS

INCORPORATION BY REFERENCE

This is a Continuation Application of U.S. patent application Ser. No. 13/673,701, filed Nov. 9, 2012, which is a Continuation Application of U.S. patent application Ser. No. 12/382,353, filed on Mar. 13, 2009, which claims priority to Japanese Patent Application No. 2008-069448, filed on Mar. 18, 2008, and Japanese Patent Application No. 2009-044307, filed on Feb. 26, 2009, the entire contents of which are incorporated herein by reference.

BACKGROUND OF THE INVENTION

1. Field of the Invention

The present invention relates to an image saving apparatus, an image transfer apparatus and an image transmission apparatus.

2. Description of Related Art

The camera disclosed in Japanese Laid Open Patent Publication No. 2006-80860 transmits reduced image data generated to express a reduced image based upon a main image to another device before transmitting the main image.

SUMMARY OF THE INVENTION

While the camera in the related art may be included in a configuration with a transfer apparatus equipped with a storage device where image data transmitted from the camera are recorded, installed between the camera and the other device and image data may be transmitted from the transfer apparatus to the device in response to an image transfer request issued from the device, a viable transfer method that may be adopted when there are no image data in the storage device at the transfer apparatus is yet to be proposed.

According to the 1st aspect of the present invention, in an image transfer system configured with an image transmission apparatus, an image transfer apparatus and the image saving apparatus, an image transmission apparatus transmits image data recorded in a storage medium to the image transfer apparatus, the image transfer apparatus receives the image data transmitted from the image transmission apparatus, records the image data into a first storage device and transfers the image data to the image saving apparatus in response to a request issued from the image saving apparatus, and the image saving apparatus receives the image data transmitted from the image transfer apparatus and records the image data into a second storage device; the image saving apparatus comprises the second storage device; a communication unit engaged in communication with the image transfer apparatus; a recording control unit for controlling read and write at the second storage device of management information indicating whether or not each set of image data is recorded in the storage medium and in the first storage device; a request receiving unit for receiving an image transfer request from a user; a decision-making unit for making a decision as to whether or not target image data, a request for which has been received at the request receiving unit, are recorded in the first storage device by referencing the management information read via the recording control unit; an image requesting unit for issuing a transmission request for the target image data to the image transfer apparatus via the communication unit if the decision-making unit determines that the target image data are recorded in the first storage device, and issuing a transmission request for the target image data to the image transmission apparatus via the image transfer apparatus engaged in communication with the communication unit if the decision-making unit determines that the target image data are not recorded in the first storage device; and an image recording unit for recording image data received via the communication unit based upon a request issued by the image requesting unit into the second storage device.

According to the 2nd aspect of the present invention, in an image transfer system configured with an image transmission apparatus, an image transfer apparatus and an image saving apparatus, the image transmission apparatus transmits image data recorded in a storage medium to the image transfer apparatus, the image transfer apparatus receives the image data transmitted from the image transmission apparatus, records the image data into a first storage device and transfers the image data to the image saving apparatus in response to a request issued from the image saving apparatus, and the image saving apparatus receives the image data transmitted from the image transfer apparatus and records the image data into a second storage device; the image transfer apparatus comprises: the first storage device; a first communication unit engaged in communication with the image transmission apparatus; a second communication unit engaged in communication with the image saving apparatus; an image data recording control unit for recording image data received from the image transmission apparatus via the first communication unit into the first storage device; a recording control unit for controlling read and write at the first storage device of management information indicating whether or not each set of image data is recorded in the storage medium and in the first storage device; a request receiving unit for receiving an image data transmission request from the image saving apparatus via the second communication unit; a decision-making unit for making a decision as to whether or not target image data, a request for which has been received at the request receiving unit, are recorded in the first storage device by referencing the management information read via the recording control unit; and an image transmission unit for reading out the target image data from the first storage device and transmitting the target image data to the image saving apparatus via the second communication unit if the decision-making unit determines that the target image data are recorded in the first storage device, and issuing a transmission request for the target image data to the image transmission apparatus via the first communication unit and transmitting the image data received from the image transmission apparatus to the image saving transmission apparatus via the second communication unit if the decision-making unit determines that the target image data are not recorded in the first storage device.

According to the 3rd aspect of the present invention, in an image transfer system configured with an image transmission apparatus, an image transfer apparatus and an image saving apparatus, the image transmission apparatus transmits image data recorded in a storage medium to the image transfer apparatus, the image transfer apparatus receives the image data transmitted from the image transmission apparatus, records the image data into a first storage device and transfers the image data to the image saving apparatus in response to a request issued from the image saving apparatus, and the image saving apparatus receives the image data transmitted from the image transfer apparatus and records the image data into a second storage device; the image transmission apparatus comprises: a communication unit engaged in communication with the image transfer apparatus; an image transmission unit for transmitting image data recorded in the storage medium to the image transfer apparatus via the communication unit; a recording control unit for controlling read and write at the storage medium of management information indicating whether or not each set of image data is recorded in the storage medium and in the first storage device; a request receiving unit for receiving an image data transmission request issued from the image saving apparatus via the image transfer apparatus engaged in communication with the communication unit; a decision-making unit for making a decision as to whether or not target image data, a request for which has been received at the request receiving unit, are recorded in the first storage device by referencing the management information read via the recording control unit; and an image providing unit for issuing a transmission instruction to the image transfer apparatus via the communication unit for transmitting the target image data to the image saving apparatus if the decision-making unit determines that the target image data are recorded in the first storage device, and reading out the target image data from the storage medium and transmitting the target image data to the image saving apparatus via the image transfer apparatus engaged in communication with the communication unit if the decision-making unit determines that the target image data are not recorded in the first storage device.

According to the 4th aspect of the present invention, in an image saving apparatus according to the 1st aspect, it is preferred that if an available capacity at the first storage device is less than a data size of image data transmitted from the image transmission apparatus, the image transfer apparatus deletes at least one set of image data recorded in the first storage device so as to secure within the first storage device sufficient memory space corresponding to the data size.

According to the 5th aspect of the present invention, in an image transfer apparatus according to the 2nd aspect, it is preferred that the image transfer apparatus further comprises: an available capacity decision-making unit for making a decision upon receiving image data from the image transmission apparatus as to whether or not an available capacity at the first storage device is equal to or greater than a data size of the image data received from the image transmission apparatus; and a deleting unit for deleting at least one set of image data recorded in the first storage device so as to secure within the first storage device sufficient memory space corresponding to the data size if the available capacity decision-making unit determines that the available capacity is less than the data size.

According to the 6th aspect of the present invention, in an image transmission apparatus according to the 3rd aspect, it is preferred that if an available capacity at the first storage device is less than a data size of image data transmitted from the image transmission apparatus, the image transfer apparatus deletes at least one set of image data recorded in the first storage device so as to secure within the first storage device sufficient memory space corresponding to the data size.

According to the 7th aspect of the present invention, in an image saving apparatus according to the 1st aspect, it is preferred that the image saving apparatus further comprises: a display unit for displaying a view of display images, each being a display image generated based upon image data and received from the image transfer apparatus; an image presence decision-making unit for making a decision by referencing the management information read via the recording control unit as to whether or not corresponding image data corresponding to the display image displayed at the display unit are recorded in the storage medium and in the first storage device; and an erasing unit for erasing the display image, from the view, related to the corresponding image data determined by the image presence decision-making unit to be not present in the recording medium or in the first storage device.

According to the 8th aspect of the present invention, in an image transfer apparatus according to the 2nd aspect, engaged in operation in conjunction with the image saving apparatus, at which a view of display images, each being a display image generated based upon image data and received from the image transfer apparatus, is displayed, it is preferred that the image transfer apparatus further comprises: an image presence decision-making unit for making a decision by referencing the management information read via the recording control unit when image data have been deleted from the first storage device as to whether or not image data identical to the deleted image data are recorded in the storage medium; and an erasure instruction unit for issuing an erase instruction to the image saving apparatus for erasing the display image corresponding to the deleted image data if the image presence decision-making unit determines that image data identical to the deleted image data are not recorded in the storage medium.

According to the 9th aspect of the present invention, in an image transmission apparatus according to the 3rd aspect, engaged in operation in conjunction with the image saving apparatus, at which a view of display, each being a display image generated based upon image data and received from the image transfer apparatus, is displayed, it is preferred that the image transmission apparatus further comprises: an image presence decision-making unit for making a decision by referencing the management information read via the recording control unit when image data have been deleted from the storage medium as to whether or not image data identical to the deleted image data are recorded in the first storage device; and an erasure instruction unit for issuing an erase instruction to the image saving apparatus for erasing a display image corresponding to the deleted image data if the image presence decision-making unit determines that image data identical to the deleted image data are not recorded in the first storage device.

According to the 10th aspect of the present invention, in an image saving apparatus according to the 1st aspect, it is preferred that the image saving apparatus further comprises: an updating unit for updating the management information if image data are added to the storage medium, if image data are added to the first storage device, if image data are deleted from the storage medium, if image data are deleted from the first storage device, if the storage medium is initialized, if the first storage device is initialized or if the storage medium is disengaged from the image transmission apparatus.

According to the 11th aspect of the present invention, in an image transfer apparatus according to the 2nd aspect, it is preferred that the image transfer apparatus further comprises: an updating unit for updating the management information if image data are added to the storage medium, if image data are added to the first storage device, if image data are deleted from the storage medium, if image data are deleted from the first storage device, if the storage medium is initialized, if the first storage device is initialized or if the storage medium is disengaged from the image transmission apparatus.

According to the 12th aspect of the present invention, in an image transmission apparatus according to the 3rd aspect, it is preferred that the image transmission apparatus further comprises: an updating unit for updating the management information if image data are added to the storage medium, if image data are added to the first storage device, if image data are deleted from the storage medium, if image data are deleted from the first storage device, if the storage medium is initialized, if the first storage device is initialized or if the storage medium is disengaged from the image transmission apparatus.

According to the 13th aspect of the present invention, in an image saving apparatus according to the 7th aspect, it is preferred that the image saving apparatus further comprises: an updating unit for updating the management information when the image saving apparatus receives list data listing the image data stored in the first storage device.

According to the 14th aspect of the present invention, in an image saving apparatus according to the 13th aspect, it is preferred that following an update of the management information, if the image presence decision making unit determines, based upon the management information that the corresponding image data are recorded in at least either the storage medium or the first storage device and the display image for the corresponding image data is not displayed in the view, the display unit receives the display image from the image transfer apparatus and displays the display image in the view.

According to the 15th aspect of the present invention, in an image transfer apparatus according to the 2nd aspect, it is preferred that following an interruption in communication via the second communication unit, if an available capacity at the first storage device is less than a data size of image data transmitted by the image transmission apparatus, the image data recording control unit aborts recording of the image data received from the image transmission apparatus via the first communication unit into the first storage device.

According to the 16th aspect of the present invention, in an image transmission apparatus according to the 3rd aspect, it is preferred that based upon an image data transmission prohibition notice issued from the image transfer apparatus, the image transmission unit prohibits transmission of image data recorded in the storage medium to the image transfer apparatus via the communication unit.

BRIEF DESCRIPTION OF THE DRAWINGS

FIG. 5 presents a specific example of the management database;

DESCRIPTION OF PREFERRED EMBODIMENT

—First Embodiment—

Figure 1:
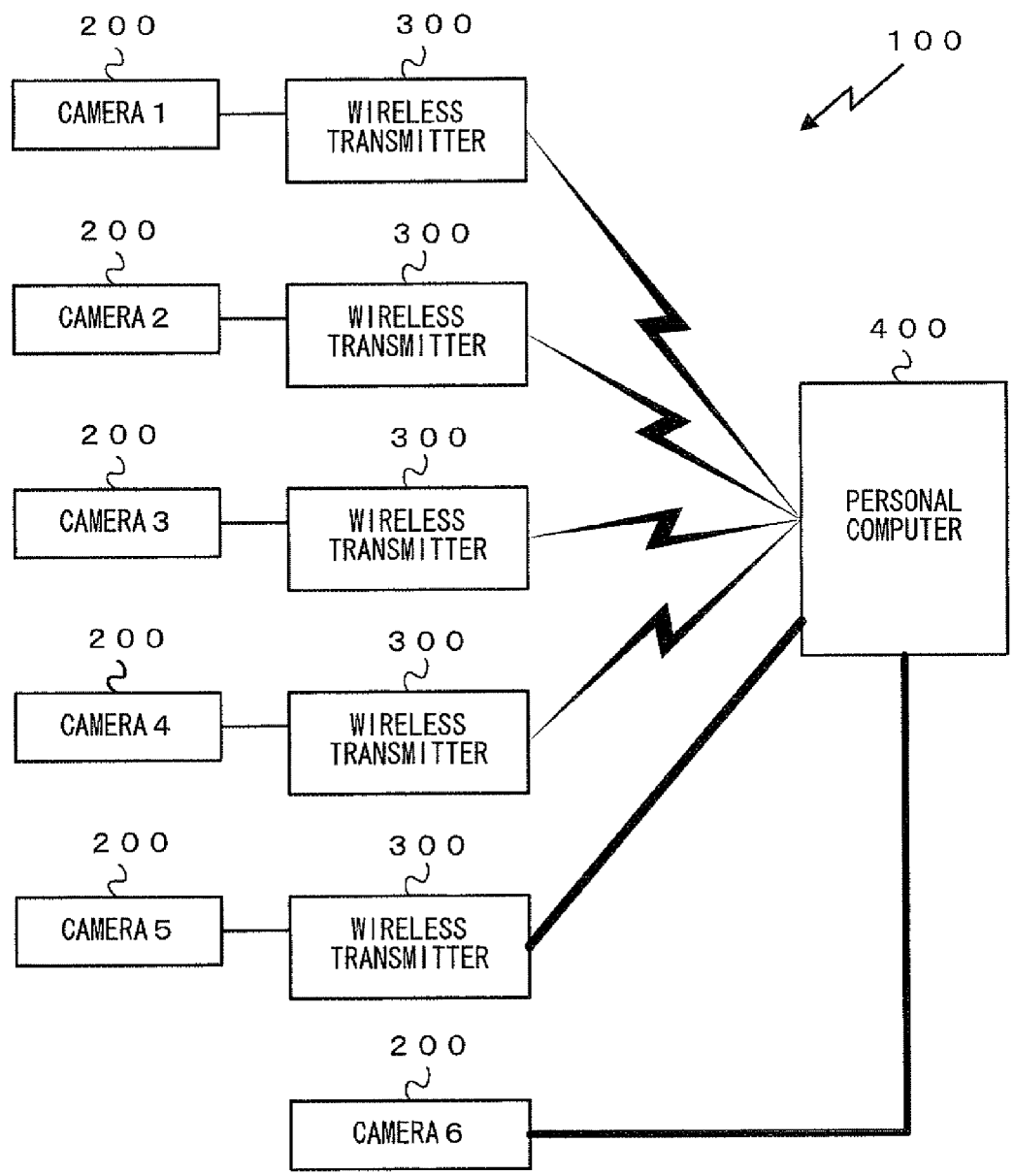
FIG. 1 is a block diagram showing the structure adopted in the image transfer system achieved in an embodiment.

FIG. 1 is a block diagram showing the structure that may be adopted in the image transfer system achieved in the first environment. The image transfer system 100 includes cameras 200, wireless transmitters 300 and a personal computer 400. It is to be noted that in image transfer system 100, the cameras function as an image transmission apparatus that transmits an image file obtained by photographing an image to the personal computer 400 via the corresponding wireless transmitter 300. The wireless transmitter 300 functions as an image transfer apparatus, i.e., a relay device via which the image file originating from the camera 200 is transmitted to the personal computer 400. In addition, the personal computer 400 functions as an image saving apparatus where the image file, having been received via the wireless transmitter 300, is recorded.

The camera 200 and the wireless transmitter 300 are connected with each other via the respective interface units through which their connection is established. Each time a photographing operation is executed in the camera 200, the resulting image file is transferred to the wireless transmitter 300 where it is recorded into a storage medium installed in the wireless transmitter 300.

The wireless transmitter 300 and the personal computer 400 are connected with each other either wirelessly or through a wired connection. For instance, the wireless transmitter 300 may include a wireless module that allows it to connect with a wireless LAN and a LAN interface to which a LAN cable is connected. Such a wireless transmitter 300 and the personal computer 400 may be connected with each other through a wireless LAN or a wired LAN. The user starts up a dedicated image transfer application program on the personal computer 400 to see a view of thumbnail images corresponding to images recorded in the storage medium in the wireless transmitter 300, select a specific thumbnail image in the view of thumbnail images, obtain the image file corresponding to the thumbnail image and the like.

As shown in FIG. 1, the personal computer 400 is capable of simultaneously communicating with a plurality of wireless transmitters 300. A limit may be set to the number of wireless transmitters 300 with which the personal computer is allowed to communicate at once and the personal computer 400 in the embodiment is allowed to simultaneously communicate with, for instance, five wireless transmitters 300 either wirelessly or through wired communication. In the example presented in FIG. 1, the personal computer 480 is in wireless communication with the wireless transmitters 300 connected to cameras 1~4, where it is also engaged in wired communication with the wireless transmitter 300 connected to a camera 5.

In addition, the personal computer 400 is capable of directly communicating with a given camera 200 instead of communicating via a wireless transmitter 300. Such direct communication with a camera 200 may be enabled via, for instance, a USE cable connecting the personal computer 400 with the camera 200. In the example presented in FIG. 1, the personal computer 400 is engaged in direct communication with a camera 6.

Figure 2:
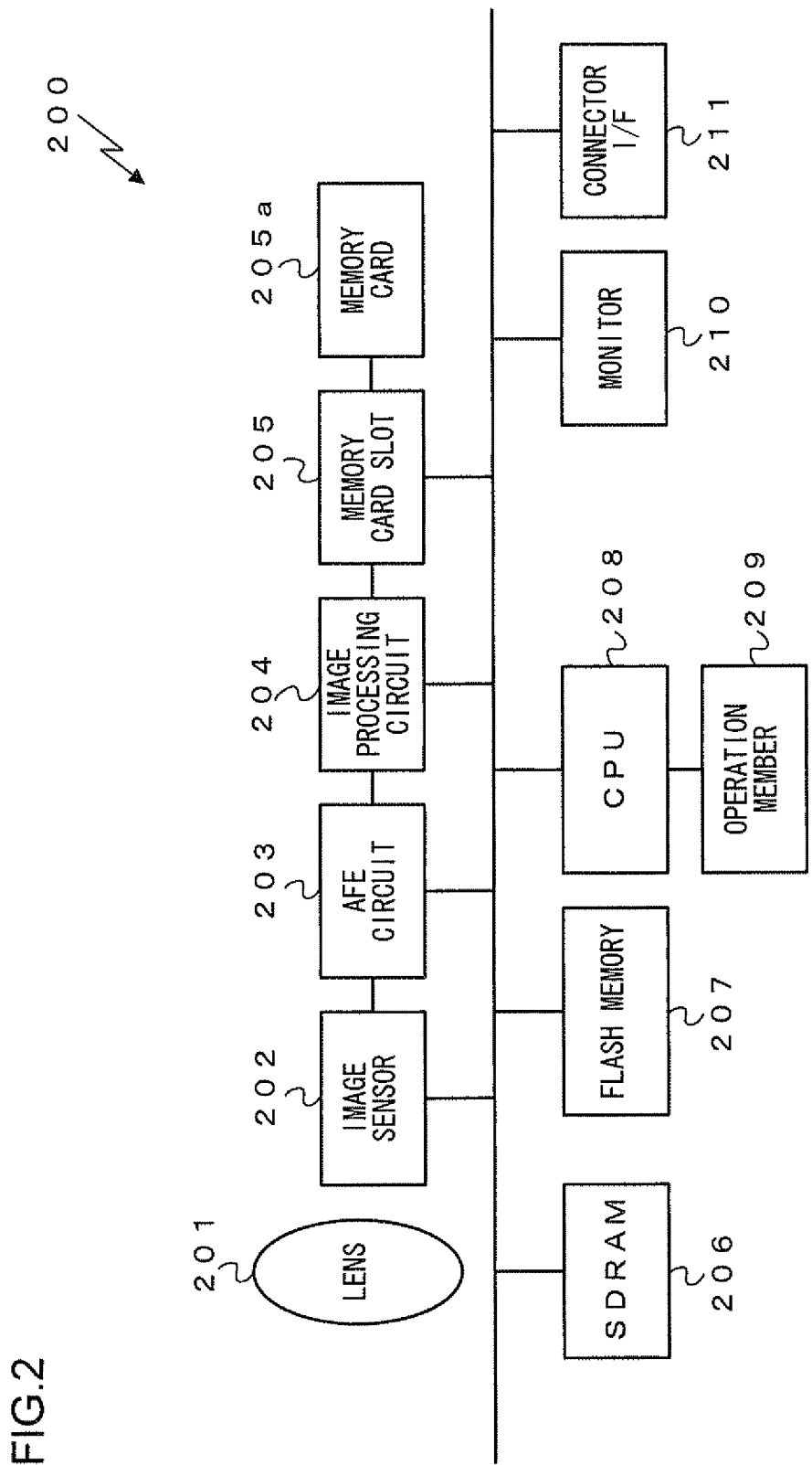
FIG. 2 is a block diagram showing a structure that may be adopted in a camera 200 in the embodiment.

FIG. 2 is a block diagram showing a structure that may be adopted in the cameras 200 in the embodiment. The camera 200 in FIG. 2 includes a lens 201, an image sensor 202, an AFE (analog front end) circuit 203, an image processing circuit 204, a memory card slot 205, an SDRAM 206, a flash memory 207, a CPU 208, an operation member 209, a monitor 210 and a connector I/F 211.

A control program recorded in the flash memory 207 is read into the SDRAM 206 and executed in the SDRAM 206 by the CPU 208 so as to control the overall operation of the camera 200. It is to be noted that the SDRAM 206, which is a volatile memory, is utilized as a work memory by the program during program execution by the CPU 208 or as a buffer memory where data are temporarily recorded. In the flash memory 207 constituted with a non-volatile memory, data related to the program executed by the CPU 208, various parameters which are read for the program execution and the like are recorded.

The lens 201 is constituted with a plurality of optical lenses and a subject image is formed onto the image sensor 202 via the group of lenses. The image sensor 202 may be a CCD image sensor or a CMOS image sensor that executes photoelectric conversion on the subject image to generate analog image signals and outputs the analog image signals thus generated to the AFE circuit 203.

The AFE circuit 203 executes gain adjustment, such as signal amplification corresponding to a selected ISO speed (ISO sensitivity) setting, on the analog image signals. The analog image signals are then converted to digital image data in an A/D conversion circuit built into the AFE circuit 203 and the digital image data resulting from the conversion are output from the AFE circuit to the image processing circuit 204.

The image processing circuit 204 executes various types of image processing, e.g., color interpolation processing, gradation conversion processing, edge emphasis processing and white balance adjustment processing on the digital image data and the image data having undergone the image processing (hereafter simply referred to as "image data") are output from the image processing circuit to the SDRAM 206 functioning as a buffer memory.

The CPU 208 reduces the image data recorded in the SDRAM 206 and generates thumbnail image data. The CPU 208 then generates an image file containing the image data and the thumbnail image data. The CPU 208 records the image file into the flash memory 208 used as the internal memory or into a memory card 205a loaded into the memory card slot 205 and used as an external memory. It is to be noted that the memory card slot 205 includes a slot portion where the memory card 205a used as the external memory is inserted and an image file is written into the memory card 205a or an image file is read out from the memory card 205a via the memory card slot 205 in response to an instruction issued from the CPU 208.

The operation member 209 includes various types of operation members operated by the user, such as a power button, a shutter release button, a zoom button, a cross key, and a confirm button. The monitor 210 is a liquid crystal monitor (back side monitor) mounted at the rear of the camera 200. The CPU 208 outputs information such as an image file stored in the memory card 205a or a setting menu to the monitor 210 so as to bring up on display at the monitor 210 the image or the setting menu in which settings for the camera 200 can be selected. The connector I/F 211 is an interface unit via which the camera 200 is connected with the wireless transmitter 300 as described earlier.

Figure 3:
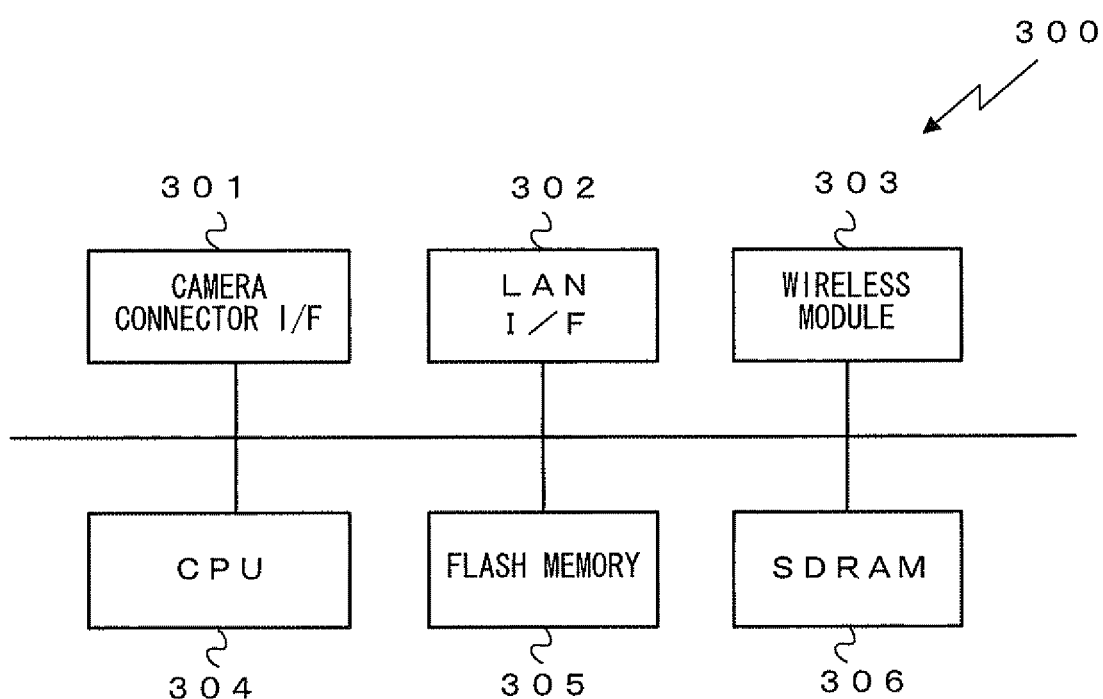
FIG. 3 is a block diagram showing a structure that may be adopted in a wireless transmitter 300 in the embodiment.

FIG. 3 is a block diagram showing a structure that may be adopted in the wireless transmitter 300 in the embodiment. The wireless transmitter 300 comprises a camera connector I/F 301, a LAN I/F 302, a wireless module 303, a CPU 304, a flash memory 305 and an SDRAM 306.

The camera connector I/F 301 is an interface unit via which the wireless transmitter 300 is connected with the camera 200, as described earlier. The LAN I/F 302 is an interface unit to which the LAN cable is connected to establish a wired connection for the wireless transmitter 300 and the personal computer 400. The wireless module 303 controls wireless connection between the wireless transmitter 300 and the personal computer achieved through a wireless communication with the personal computer 400.

In the flash memory 305 constituted with a nonvolatile memory, an image file transferred from the camera 200, various parameters read for the program execution and the like are recorded. As explained earlier, the image file transferred from the camera 200 contains image data (main image data) expressing the main image obtained through photographing operation and image data (thumbnail image data) expressing the thumbnail image generated by reducing the main image. The SDRAM 306, which is a volatile memory, is utilized as a work memory by the program during program execution by the CPU 304 or as a buffer memory where data are temporarily recorded.

The CPU 304 controls the various units constituting the wireless transmitter 300. For instance, as an image file originating from the camera 200 is input via the camera connector I/F 301, the CPU 304 executes control so as to record the image file into the flash memory 305 used as a storage medium. In addition, an image file recorded in the flash memory 305 is opened in the SDRAM 306 functioning as a buffer memory and is transferred to the personal computer 400 via the LAN I/F 302 or the wireless module 303 under control executed by the CPU.

Figure 4:
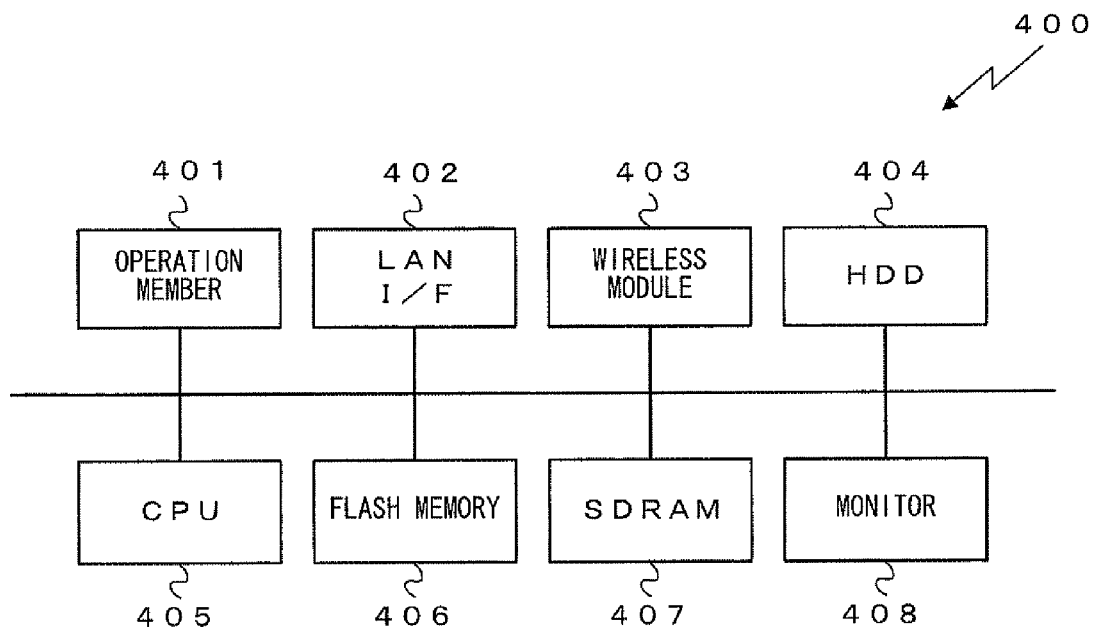
FIG. 4 is a block diagram showing the structure that may be adopted in a personal computer 400 in the embodiment.

FIG. 4 is a block diagram showing a structure that may be adopted in the personal computer 400 in the embodiment. The personal computer 400 includes an operation member 401, a LAN I/F 402, a wireless module 403, an HDD (hard disk drive) 404, a CPU 405, a flash memory 406, an SDRAM 407 and a monitor 408.

The operation member 401 includes various devices operated by the user, such as a keyboard and a mouse. The LAN I/F 402 is an interface unit that is connected with a LAN cable to establish a wired connection with a wireless transmitter 300. The wireless module 403 controls wireless communication with the wireless transmitter 300.

The HDD 404 is a storage medium in which image files obtained from the wireless transmitter 300, various programs to be executed by the CPU 405 and the like are recorded. The CPU 405 controls the various units constituting the personal computer 400.

In the flash memory 406 constituted with a nonvolatile memory, various parameters read for the program execution and the like are recorded. The SDRAM 407, which is a volatile memory, is utilized as a work memory by the program during program execution by the CPU 405 or as a buffer memory where data are temporarily recorded. At the monitor 408, which may be, for instance, a liquid crystal monitor, various types of information output from the CPU 405 are brought up on display.

In the image transfer system 100 configured as described above, an image file containing an image having been photographed with a given camera 200 is recorded into the memory card 205a in the camera 200 and is also transmitted to the corresponding wireless transmitter 300 where it is recorded into the flash memory 305. Thus, the image file is recorded into both the memory card 205a in the camera 200 and the flash memory 305 in the wireless transmitter 300.

However, if the user deletes the image file from the memory card 205a, the memory card 205a is formatted (initialized) or the memory card 205a is taken out of the memory card slot 205, only the flash memory 305 shall hold the image file. In addition, if the image file is deleted from the flash memory 305 in the wireless transmitter 300 or the flash memory 305 is formatted as described later, only the memory card 205a shall hold the image file. There may also be a situation in which the image file no longer exists either in the memory card 205a or in the flash memory 305.

A common scenario in which an image file is deleted from the flash memory 305 in the wireless transmitter 300 is now described. The flash memory 305 has a limited storage capacity. Thus, as image files transmitted from the camera 200 are accumulated in the flash memory 305, the available storage capacity of the flash memory 305 gradually decreases. Eventually, a situation shall arise in which the available capacity in the flash memory 305 is less than the data size of the most recently received image file originating from the camera 200 and the newly received image file cannot be recorded into the flash memory 305.

Accordingly, each time an image file is received from the camera 200, the CPU 304 in the embodiment compares the available capacity in the flash memory 305 with the data size of the received image file and if the available capacity is less than the image file data size, the CPU 304 deletes at least one image file in the flash memory 305 in order to assure sufficient memory space available for recording the most recently received image file.

In the embodiment, the CPU 304 deletes image files holding most dated images among the image files recorded in the flash memory 305. For instance, if the available capacity can be increased to assure sufficient memory space for recording the newly received image file by deleting the single image file with the oldest photographing date, the CPU 304 deletes the image file with the oldest photographing date among the image files recorded in the flash memory 305.

However, the available capacity may not be increased to assure sufficient memory space for recording the newly received image file by deleting the oldest image file alone. Under such circumstances, the CPU 304 deletes image files in the chronological order, i.e., it deletes image files with the oldest photographing dates, as many as needed to create sufficient memory space for recording the newly received image file, among the image files recorded in the flash memory 305.

As explained earlier, the user issues an image file acquisition instruction to obtain an image file from the wireless transmitter 300 by selecting a thumbnail image in the view of thumbnail images brought up at the monitor 408. However, under circumstances such as those described above, the image file desired by the user may not be recorded in the flash memory 305. In this situation, provided that the particular image file is recorded in the memory card 205a in the camera 200, the CPU 405 issues an image file transmission instruction to the camera 200 via the wireless transmitter 300 in the embodiment.

This system requires information based upon which a decision can be made as to whether or not each of the image files corresponding to the thumbnail images displayed in the view of thumbnail images at the monitor 408 is recorded in the memory card 205a and the flash memory 305, to be managed in the camera 200, the wireless transmitter 300 or the personal computer 400.

In the first embodiment, the information used to make a decision as to whether each image file is recorded in the memory card 205a and the flash memory 305 is managed at the personal computer 400. In more specific terms, a management database holding management information based upon which image file recording locations are managed is recorded in the flash memory 406 and upon receiving an image file acquisition request issued by the user, the CPU 405 references the management database so as to make a decision as to whether or not the target image file can be obtained from the wireless transmitter 300. Then, if the target image file is judged to be available from the wireless transmitter 300, the CPU 405 issues an image file transmission request to the wireless transmitter 300.

If, on the other hand, it is decided that the target image file cannot be obtained from the wireless transmitter 300, the CPU 405 makes a decision as to whether or not the image file can be obtained from the camera 200 and if the image file is judged to be available from the camera, the CPU issues an image file transmission request to the camera 200. It is to be noted that the CPU 405 in the embodiment executes the processing described above in response to an acquisition request for the image file corresponding to the thumbnail image selected by the user in the view of thumbnail images brought up at the monitor 408 as described earlier. It is also to be noted that the management database may be recorded in the HDD 404 instead of in the flash memory 406.

FIG. 5 presents an example of information that may be recorded in the management database. The image file recording status indicating whether or not each image file is recorded in the memory card 205*a* and the flash memory 305 is managed by using flags in the management database. In the example presented in FIG. 5, the recording status is managed in correspondence to the file name of each image file by using a camera flag indicating whether or not the image file is recorded in the memory card 205*a* and a wireless transmitter flag (WT flag) indicating whether or not the image file is recorded in the flash memory 305.

Namely, if the image file is recorded in the memory card 205*a*, the camera flag corresponding to the file name assigned to the particular image file is set to 1, whereas if the image file is not recorded in the memory card 205*a*, the camera flag corresponding to the file name assigned to the image file is set to 0. In addition, if the image file is recorded in the flash memory 304, the WT flag corresponding to the file name assigned to the particular image file is set to 1, whereas if the image file is not recorded in the flash memory 305, the WT flag corresponding to the file name assigned to the image file is set to 0.

As described earlier, an image file resulting from a photographing operation executed in the camera 200 is recorded into the memory card 205*a* and is also transmitted to the wireless transmitter 300 where it is recorded into the flash memory 305. At this time, the camera flag and the WT flag corresponding to the image file are both set to 1. For instance, the flags corresponding to the image file assigned with file name DSC_0001.JPG are set to 1 in FIG. 5.

However, if the flash memory 305 is formatted or an image file is deleted from the flash memory 305 while the same image file still resides in the memory card 205*a*, the camera flag corresponding to the file name of the image file shall remain at 1 but the WT flag shall be reset to 0. For instance, the flags corresponding to the image file assigned with the file name DSC_0002.JPG assume such settings in FIG. 5.

In addition, if the memory card 205*a* is formatted, the memory card 205*a* is taken out of the memory card slot 205 or an image file is deleted from the memory card 205*a* while the same image file still resides in the flash memory 305, the WT flag corresponding to the file name assigned to the image file shall remain at 1 but the camera flag shall be reset to 0. For instance, the flags corresponding to the image file assigned with file name DSC_0003.JPG assume such settings in FIG. 5.

If an image file is coincidentally deleted both from the memory card 205*a* and from the flash memory 305, the camera flag and the WT flag corresponding to the file name assigned to the particular image file shall both be set to 0. For instance, the flags for the image file assigned with file name DSC_0004.JPG assume such settings in FIG. 5.

Figure 6:
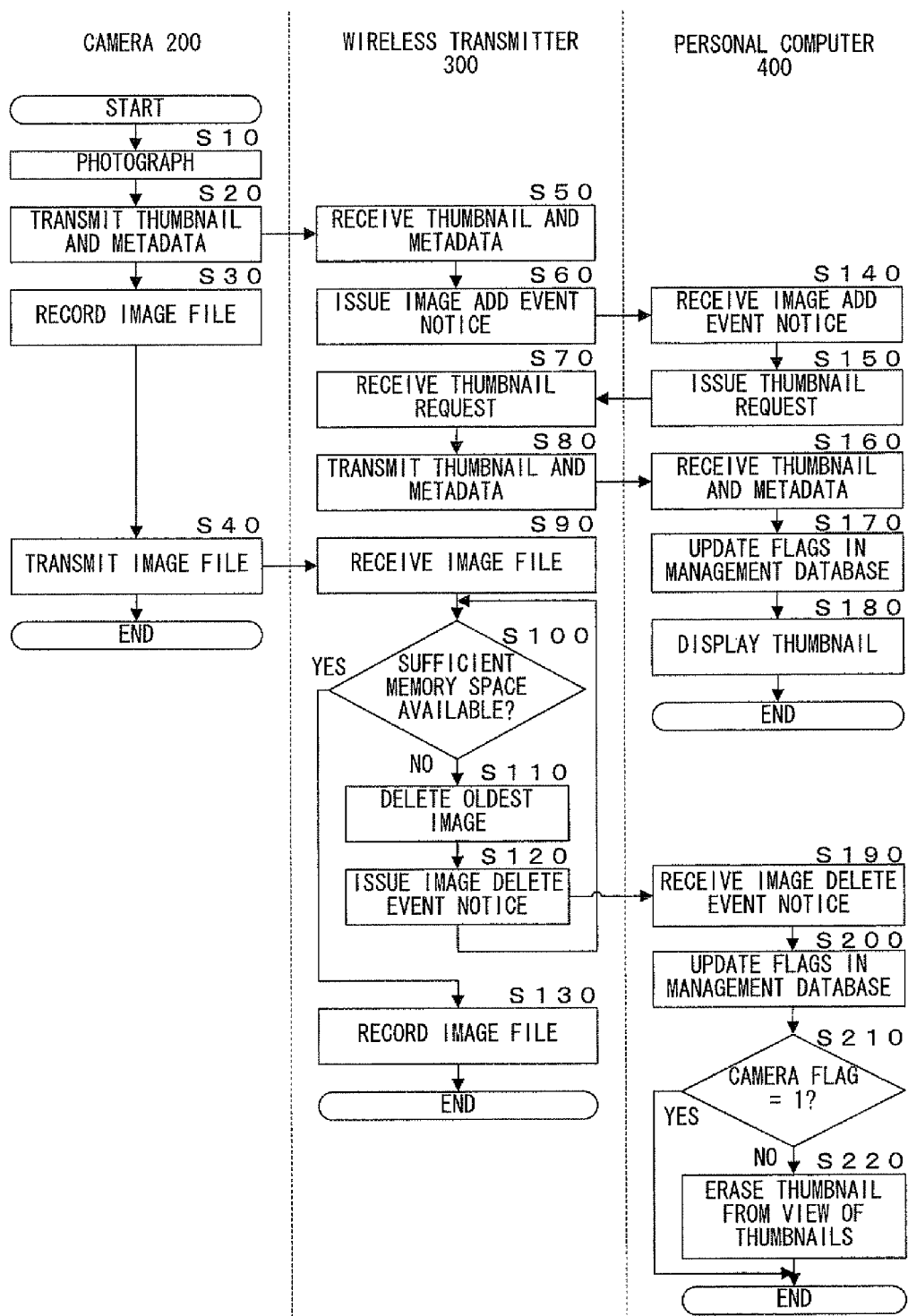
FIG. 6 presents a flowchart of the processing executed as an image is photographed with a camera 200 in a first embodiment.

The following is a description of the flow of processing executed in the first embodiment, given in reference to FIGS. 6 through 10. FIG. 6 presents a flowchart of the processing executed in the camera 200, the wireless transmitter 300 and the personal computer 400 as an image is photographed with the camera 200. The processing shown in FIG. 6 starts as the user operates the shutter release button included in the operation member 209 at the camera 200.

In step S10, the CPU 208 in the camera 200 photographs an image as described earlier in response to a shutter release operation performed by the user and generates an image file. At this time, the CPU 208 generates thumbnail image data expressing a display image based upon the image data having been obtained, records the thumbnail image data into the SDRAM 206 and also adds the thumbnail image data into the image file. In addition, the CPU 208 generates metadata related to the photographing date/time and the photographing conditions and records the metadata into the SDRAM 206. The metadata are also recorded into the image file. Furthermore, the data in the image file thus generated are temporarily recorded into the SDRAM 206.

The operation then proceeds to step S20, in which the CPU 208 transmits the thumbnail image data and the metadata recorded in the SDRAM 206 to the wireless transmitter 300, before the operation proceeds to step S30. In step S30, the CPU 208 records the image file recorded in the SDRAM 206 into the memory card 205*a*. Subsequently, the operation proceeds to step S40 in which the CPU 208 transmits the data in the image file recorded in the SDRAM 206 to the wireless transmitter 300 before the processing ends.

The CPU 304 in the wireless transmitter 300 receives the thumbnail image data and the metadata transmitted from the camera 200 and records the received data into the SDRAM 306 in step S50. The operation then proceeds to step S60 in which the CPU 304 issues an image add event notice to the personal computer 400 so as to report to the personal computer 400 that a new image has been added. Upon receiving the image add event notice in step S140, the CPU 405 in the personal computer 400 issues a signal requesting a thumbnail image transmission to the wireless transmitter 300 in step S150.

Upon receiving the thumbnail request in step 70, the CPU 304 transmits the thumbnail image data and the metadata recorded in the SDRAM 306 to the personal computer 400 in step S80. In step S160, the CPU 405 receives the thumbnail image data and the metadata transmitted from the wireless transmitter 300 and records the received data into the SDRAM 407 before the operation proceeds to step S170.

In step S170, the CPU 405 registers the filename of the image file corresponding to the thumbnail image data having been received, and the camera flag and the WT flag for the image file into the management database recorded in the flash memory 406, in order to manage the recording locations of the image file corresponding to the thumbnail image data. It is to be noted that the CPU 405 ascertains the file name of the image file corresponding to the received thumbnail image data by referencing the metadata recorded in the SDRAM 407.

In more specific terms, the CPU 405 registers the file name assigned to the image file in the management database shown in FIG. 5 and sets both the camera flag and the WT flag corresponding to the file name to 1. As a result, the personal computer 400 is able to keep abreast of the recording status of the image file newly photographed with the camera 200, i.e., the image file is recorded in both the memory card 205*a* at the camera 200 and in the flash memory 305 at the wireless transmitter 300.

Subsequently, the operation proceeds to step S180, in which the CPU 405 adds the image (thumbnail image) expressed with the thumbnail image data recorded in the SDRAM 407 in the view of thumbnail images at the monitor 408, before the processing ends.

As described above, before recording the image file into the memory card 205*a*, the CPU 208 in the camera 200 transmits the thumbnail image data to the wireless transmitter 300 in step S20. Thus, the thumbnail image data can be promptly transmitted to the wireless transmitter 300 without having to wait for the write into the memory card 205*a* to be completed. In addition, the CPU 304 in wireless transmitter 300 transmits the thumbnail image data originating from the camera 200 to the personal computer 400, which, in turn, outputs the received thumbnail image data to the monitor 408 to be added into the view of thumbnail images. Consequently, the thumbnail image of the image having been photographed with the camera 200 can be quickly brought up on display at the monitor 408.

In addition, the CPU 304 in the wireless transmitter 300 receives the data in the image file transmitted from the camera 200 and records the received data into the SDRAM 306 in step S90. Then, the operation proceeds to step S100, in which the CPU 304 compares the data size of the image file recorded into the SDRAM 306 with the available capacity at the flash memory 305 so as to make a decision as to whether or not the flash memory 305 has sufficient memory space available to record the new image file. If a negative decision is made, the operation proceeds to step S110.

In step S110, the CPU 304 references the metadata corresponding to the individual image files recorded in the flash memory 305, so as to identify the image file with the oldest photographing date and delete the identified image file from the flash memory 305. Subsequently, the operation proceeds to step S120 in which the CPU 304 issues an image delete event notice with regard to the image file having been deleted to the personal computer 400, thereby notifying the personal computer 400 that they image file has been deleted.

In step S190, the CPU 405 receives the image delete event notice and then the operation proceeds to step S200. In step S200, the CPU 405 updates the management information with regard to the recording status of the image file having been deleted by adjusting the settings of flags corresponding to the deleted image file in the data recorded in the management database. More specifically, the CPU 405 adjusts the setting of the WT flag to 0 without altering the setting of the camera flag corresponding to the file name. Thus, the management information for the image file indicates that the image file is no longer recorded in the flash memory 305 in the wireless transmitter 300.

The operation then proceeds to step S210, in which the CPU 405 references the management database to make a decision as to whether or not the setting of the camera flag corresponding to the image file, the WT flag setting of which has been adjusted to 0, is currently 1. If a negative decision is made, the operation proceeds to step S220. A negative decision is made if the image file is not recorded in the flash memory 305 in the wireless transmitter 300 or in the memory card 205 in the camera 200. In this situation, even if the user issues an image file acquisition instruction for the particular image file, the image file is not available. Accordingly, the CPU 405 deletes the thumbnail image corresponding to the image file from the view of thumbnail images at the monitor 405 in step S220 before the processing ends.

If, on the other hand, an affirmative decision is made in step S210, the image file, having been deleted from the flash memory 305 in the wireless transmitter 300, still resides in the memory card 205*a* in the camera 200. This means that in response to an image file acquisition instruction issued by the user, the image file can be retrieved from the memory card 205*a*. Accordingly, the CPU 405 ends the processing without deleting the thumbnail image from the view of thumbnail images.

If an affirmative decision is made in step S100, the operation proceeds to step S130. Since sufficient memory space for recording the newly received image file is available in the flash memory 305, the CPU 304 records the image file received from the camera 200 into the flash memory 305 in step S130 and then the processing ends.

Figure 7:
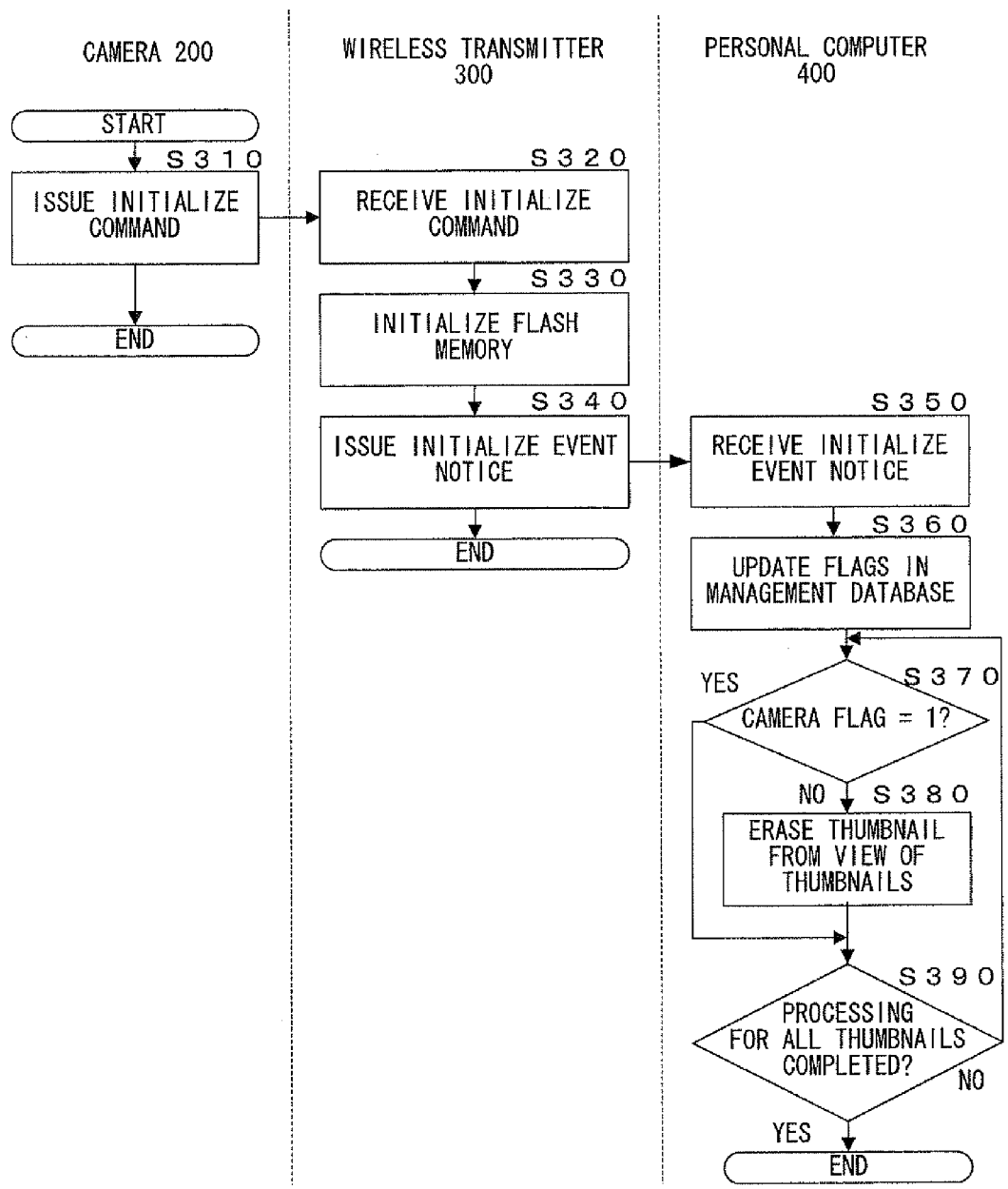
FIG. 7 presents a flowchart of the processing executed as the flash memory 305 in the wireless transmitter 300 is initialized in the first embodiment.

FIG. 7 presents a flowchart of the processing executed in the camera 200, the wireless transmitter 300 and the personal computer 400 as the flash memory 305 in the wireless transmitter 300 is initialized. It is to be noted that the user is able to issue an instruction for initialization of the flash memory 305 through a menu operation performed at the camera 200. The processing shown in FIG. 7 starts in response to an initialization instruction issued via the camera 200 by the user to initialize the flash memory 305.

In step S310, the CPU 208 in the camera 200 transmits an initialize command to the wireless transmitter 300 in response to the initialization instruction issued by the user. Upon receiving in step S320, the initialize command transmitted from the camera 200, the CPU 304 in the wireless transmitter 300 initializes the flash memory 305 in step S330. The operation then proceeds to step S340 in which the CPU 304 issues an initialize event notice to the personal computer 400 so as to report that the flash memory 305 has been initialized.

Upon receiving in step S350 the initialize event notice, the CPU 405 in the personal computer 400 updates the flag values in the management database in step S360. More specifically, it resets the settings of the WT flags corresponding to the file names of all the image files registered in the management database to 0. The operation then proceeds to step S370, in which the CPU 405 references the management database to make a decision as to whether or not the camera flag corresponding to a specific image file is currently set to 1.

If a negative decision is made, the operation proceeds to step S380. In this case, the particular image file is not recorded in the flash memory 305 in the wireless transmitter 300 or in the memory card 205*a* in the camera 200 and accordingly, the CPU 405 erases the thumbnail image corresponding to the image file from the view of thumbnail images at the monitor 408 before the operation proceeds to step S390. If, on the other hand, an affirmative decision is made in step S370, the operation proceeds directly to step S390.

In step S390, the CPU 405 makes a decision as to whether or not the processing in steps S370 and S380 has been completed in correspondence to all the image files registered in the management database. If a negative decision is made, the operation returns to step S370 to repeatedly execute the processing. If, on the other hand, an affirmative decision is made, the processing ends.

Figure 8:
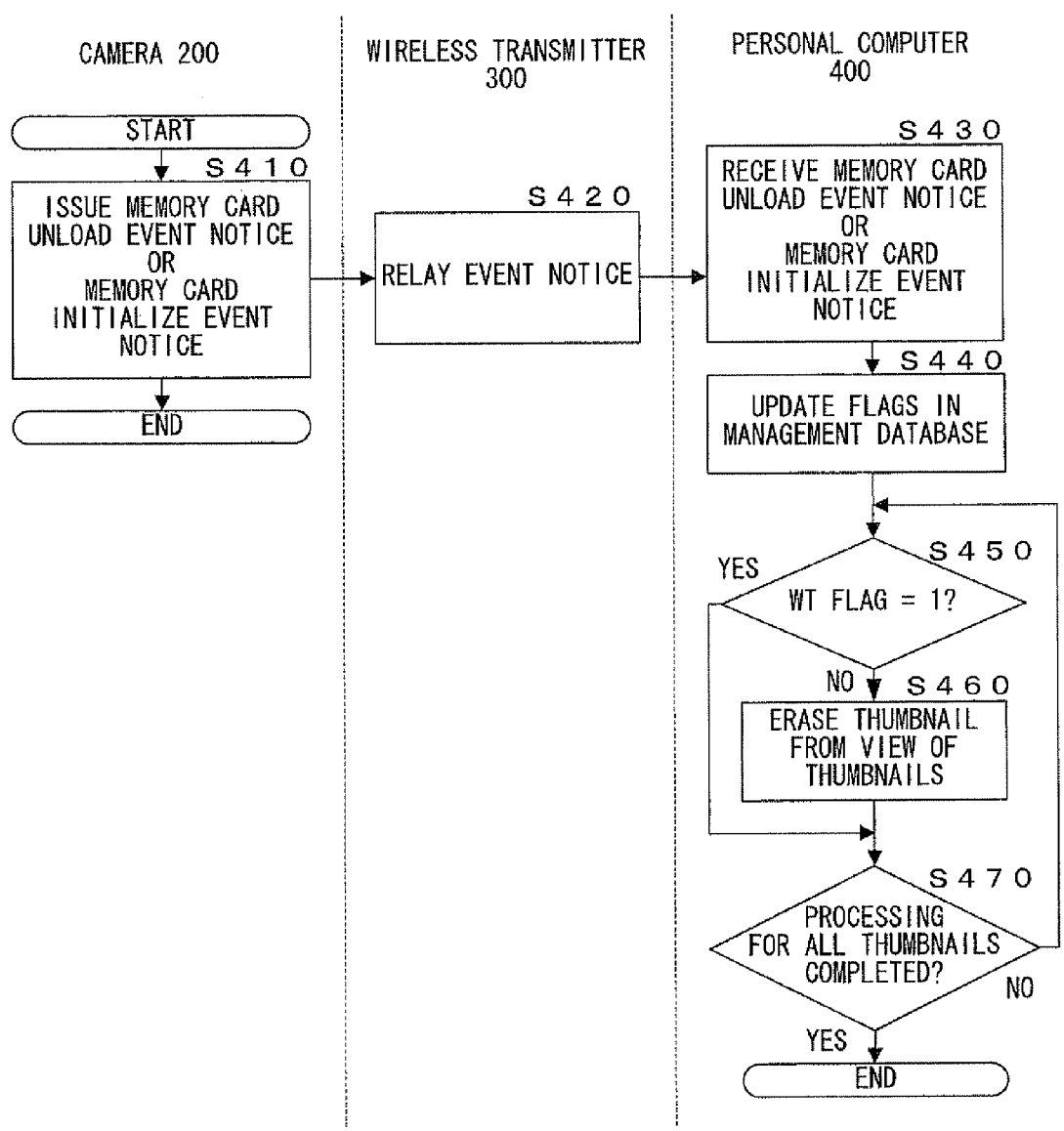
FIG. 8 presents a flowchart of the processing executed as a memory card 205a in the camera 200 is initialized or as the memory card 205a is unloaded from the memory card slot 205 in the first embodiment.

FIG. 8 presents a flowchart of the processing executed in the camera 200, the wireless transmitter 300 and the personal computer 400 as the memory card 205*a* in the camera 200 is initialized or as the memory card 205*a* is taken out of the memory card slot 205. It is to be noted that the user is able to issue an initialization instruction to initialize the memory card 205a by performing a specific menu operation at the camera 200. The processing shown in FIG. 8 starts as the memory card 205a is initialized in response to an instruction issued by the user or as the user takes out the memory card 205a from the memory card slot 205.

If the memory card 205a has been disengaged from the memory card slot 205, the CPU 208 in the camera 200 transmits a memory card unload event notice to the wireless transmitter 300 in step S410 so as to report that the memory card has been taken out. If, on the other hand, the memory card 205a has been initialized in response to an instruction issued by the user, the CPU 208 transmits a memory card initialize event notice to the wireless transmitter 300 so as to report that the memory card has been initialized.

The CPU 304 in the wireless transmitter 300, having received the event notice originating from the camera 200, transfers the event notice to the personal computer 400 in step S420.

Upon receiving in step S430 the memory card unload event notice or the memory card initialize event notice, the CPU 405 in the personal computer 400 updates flag values in the management database in step S440. More specifically, it resets the settings of the camera flags corresponding to the file names of all the image files registered in the management database to 0. The operation then proceeds to step S450, in which the CPU 405 references the management database to make a decision as to whether or not the WT flag corresponding to a specific image file is currently set to 1.

If a negative decision is made, the operation proceeds to step S460. In this case, the particular image file is not recorded in the flash memory 305 in the wireless transmitter 300 or in the memory card 205a in the camera 200 and accordingly, the CPU 405 erases the thumbnail image corresponding to the image file from the view of thumbnail images at the monitor 408 before the operation proceeds to step S470. If, on the other hand, an affirmative decision is made in step S450, the operation proceeds directly to step S470.

In step S470, the CPU 405 makes a decision as to whether or not the processing in steps S450 and S460 has been completed in correspondence to all the image files registered in the management database. If a negative decision is made, the operation returns to step S450 to repeatedly execute the processing. If, on the other hand, an affirmative decision is made, the processing ends.

Figure 9:
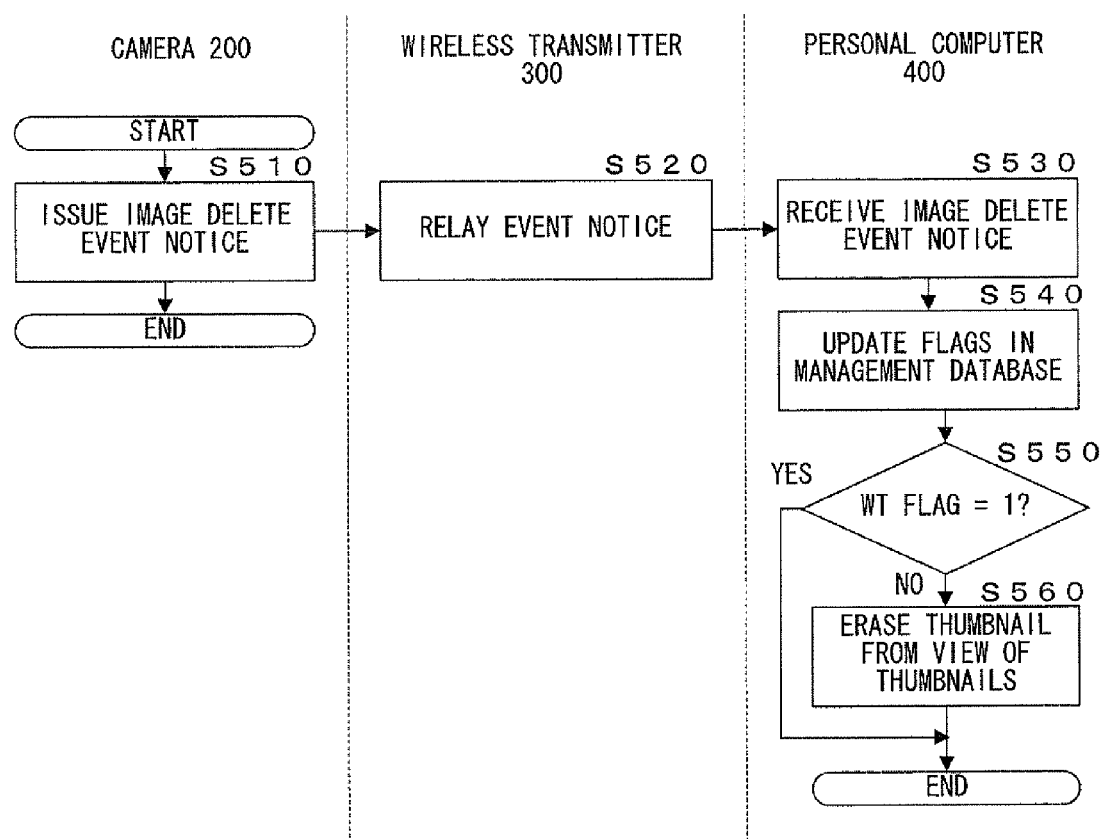
FIG. 9 presents a flowchart of the processing executed as one of the image files in the memory card 205a in the camera 200 is deleted in the first embodiment.

FIG. 9 presents a flowchart of the processing executed in the camera 200, the wireless transmitter 300 and the personal computer 400 as one of the image files in the memory card 205a in the camera 200 is deleted. It is to be noted that the user is able to issue an image file delete instruction by performing a specific menu operation or a button operation at the camera 200. The processing in FIG. 9 starts as a given image file is deleted from the memory card 205a in response to an instruction issued by the user.

In step S510, the CPU in the camera 200 issues an image delete event notice to the wireless transmitter 300 so as to report that an image has been deleted. The image delete event notice includes information that enables identification of the deleted image file, such as information indicating the file name.

Upon receiving, the event notice originating from the camera 200, the CPU 304 in the wireless transmitter 300 transfers the event notice to the personal computer 400 in step S520.

Upon receiving the image delete event notice in step S530, the CPU 405 in the personal computer 400 updates flag values in the management database in step S540. In more specific terms, it identifies the file name in the data registered in the management database, which matches the file name indicated in the image delete event notice and resets the setting of the camera flag corresponding to the filename to 0. Subsequently, the operation proceeds to step S550 in which the CPU 405 references the management database to make a decision as to whether or not the setting of the WT flag corresponding to the image file is currently 1.

If a negative decision is made, the operation proceeds to step S560. In this case, the particular image file is not recorded in the flash memory 305 in the wireless transmitter 300 or in the memory card 205a in the camera 200 and accordingly, the CPU 405 erases the thumbnail image corresponding to the image file from the view of thumbnail images at the monitor 408 before the processing ends. If, on the other hand, an affirmative decision is made in step S550, the operation ends.

Figure 10:
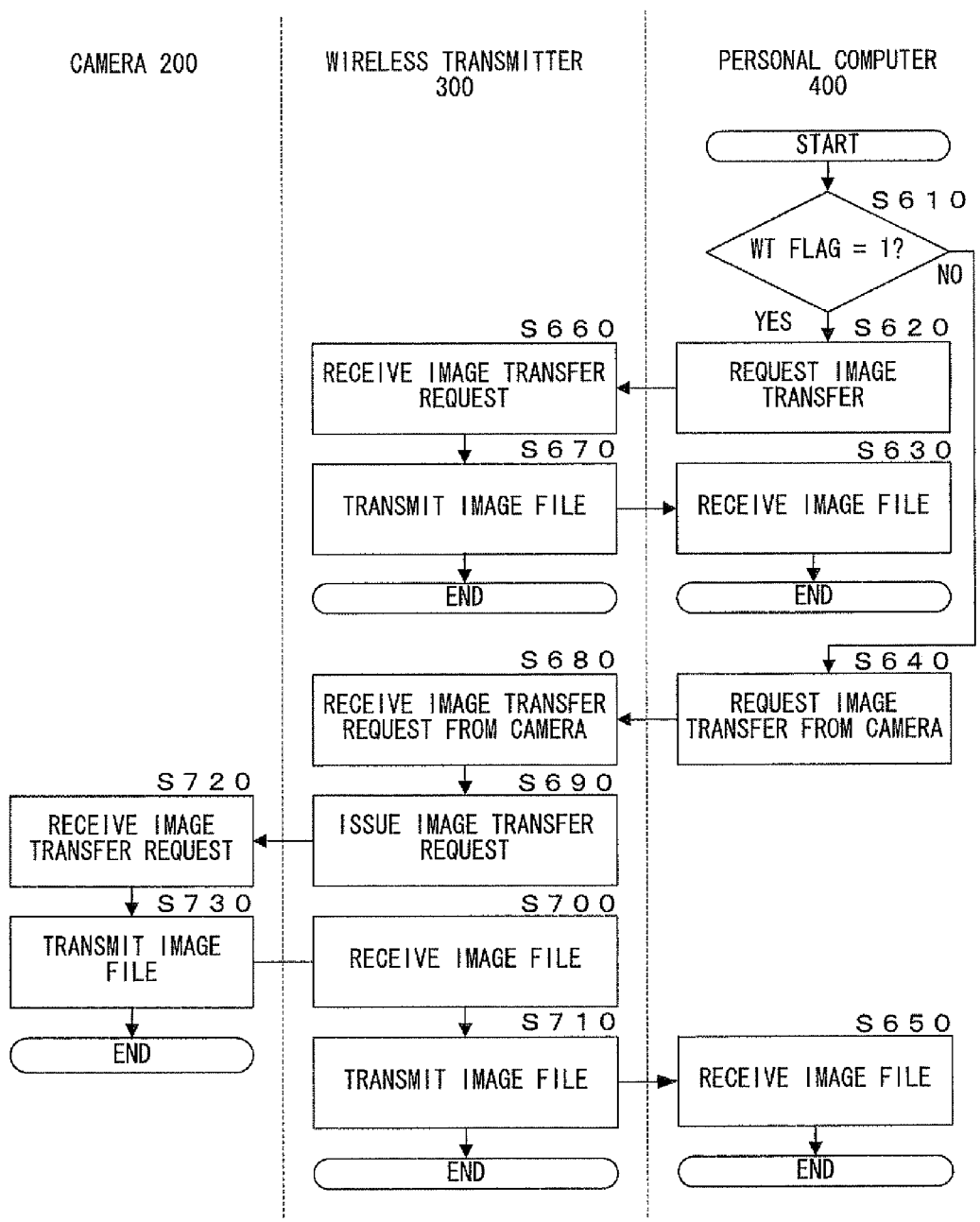
FIG. 10 presents a flowchart of the processing executed as the user issues an image file transfer request at the personal computer 400 in the first embodiment.

FIG. 10 presents a flowchart of the processing executed in the camera 200, the wireless transmitter 300 and the personal computer 400 as an image file transfer request is issued by the user via the personal computer 400. It is to be noted that the user is able to issue an image file transfer request by operating the operation member 401 to select a specific thumbnail image in the view of thumbnail images at the monitor 408, as explained earlier. The processing in FIG. 10 starts in response to an image file transfer request issued by the user via the personal computer 400.

In step S610, the CPU 405 in the personal computer 400 references the management database so as to make a decision as to whether or not the WT flag corresponding to the file name assigned to the transfer target image file requested by the user is currently set to 1. If an affirmative decision is made, the operation proceeds to step S620. The results of the decision, having been made in step S610, indicate that the transfer target image file requested by the user can be obtained from the wireless transmitter 300 and accordingly, the CPU 405 issues an image transfer request to the wireless transmitter 300 in step S620. The image transfer request contains information indicating the file name of the transfer target image file.

In step S660, the CPU 304 in the wireless transmitter 300 receives the image transfer request from the personal computer 400. Subsequently, the CPU 304 identifies the requested image file, reads out the image file from the flash memory 305 and transmits the image file to the personal computer 400 in step S670. In step S630, the CPU 405 in the personal computer 400 receives the image file transmitted from the wireless transmitter 300 and records it into the HDD 404, before the processing ends.

If, on the other hand, a negative decision is made in step S610, the operation proceeds to step S640. The results of the decision made in step S610 indicate that the transfer target image file requested by the user is not recorded in the wireless transmitter 300 and is therefore not available at the wireless transmitter. Accordingly, in step S640, the CPU 405 issues a camera-sourced image transfer request to the wireless transmitter 300 so that the wireless transmitter obtains the image from the camera 200 and then transfers the obtained image. The camera-sourced image transfer request, too, contains information indicating the file name of the transfer target image file.

Upon receiving in step S680 the camera-sourced image transfer request from the personal computer 400, the CPU 304 in the wireless transmitter 300 issues an image transfer request to the camera 200 in step S690. In step S720, the CPU 208 in the camera 200 receives the image transfer request from the wireless transmitter 300. Subsequently, the operation proceeds to step S730 in which the CPU 208 identifies the requested image file, reads out the image file from the memory card 205*a* and transmits the image file to the wireless transmitter 300.

In step S700, the CPU 304 in the wireless transmitter 300 receives the image file from the camera and then the received image file is transmitted to the personal computer 400 in step S710. In step S650, the CPU 405 in the personal computer 400 receives the image file transmitted from the wireless transmitter 300 and records the received image file into the HDD 404, before the processing ends. It is to be noted that the CPU 405 may record the received image file into the flash memory 406, instead.

The following advantages are achieved through the first embodiment described above.

(1) Via the management database recorded in the flash memory 406 installed in the personal computer 400, the recording status of each image file, i.e., whether or not the image file is recorded in the memory card 205*a* in the camera 200 and in the flash memory 305 in the wireless transmitter 300, is managed in the personal computer 400. Upon receiving an image transfer request issued by the user, the CPU 405 in the personal computer 400 references the management database so as to make a decision as to whether or not the transfer target image file is recorded in the flash memory 305. If it is decided that the image file is recorded in the flash memory 305, it issues an image file transmission request to the wireless transmitter 300, whereas if it is decided that the image file is not recorded in the flash memory 305, it issues an image file transmission request to the camera 200. The image file received at the personal computer is then recorded into the HDD 404 under control executed by the CPU 405. As a result, the recording location of the image file can be reliably managed in the personal computer 400 and the CPU 405 is able to obtain the image file from the optimal recording location and record the obtained image file.

(2) If the available capacity at the flash memory 305 is less than the data size of the image file transmitted from the camera 200, the CPU 304 in the wireless transmitter 300 deletes at least one of the existing image files in the flash memory 305 so as to make space available in the flash memory 305 to record the image file. Thus, even when the flash memory 305 does not currently have sufficient memory space available for recording the image file having been received from the camera 200, the necessary capacity can be secured to enable image file recording.

(3) The CPU 405 brings up at the monitor 408 a view of thumbnail images having been received from the wireless transmitter 300. If an image file corresponding to a thumbnail image in the view of thumbnail images at the monitor 408 is not recorded in the memory card 205*a* in the camera 200 or in the flash memory 305 in the wireless transmitter 300, the CPU 405 erases the thumbnail image corresponding to the particular image file from the list. In other words, the CPU 405 erases from the view of thumbnail images the thumbnail image of the image file no longer available either from the camera 200 or the wireless transmitter 300. Consequently, a situation in which an image transfer request from the user for an image file no longer saved either into the camera 200 or the wireless transmitter 300 is inadvertently issued does not arise.

(4) The CPU 405 updates the management database each time a new image file is added into the memory card 205*a*, each time a new image file is added into the flash memory 305, each time an image file is deleted from the memory card 205*a*, each time an image file is deleted from the flash memory 305, each time the flash memory 205*a* is initialized, each time the flash memory 305 is initialized and each time the memory card 205*a* is unloaded from the memory card slot 205 at the camera 200. The CPU 405 is thus able to keep itself up to date on the recording statuses of image files by updating the management database whenever the recording status of an image file in the memory card 205*a* or the flash memory 305 changes.

—Second Embodiment—

In reference to the second embodiment, processing that may be executed to manage the management database at the wireless transmitter 300 is described. It is to be noted that since the illustrations in FIGS. 1 through 4, in reference to which the first embodiment has been described, are also applicable to the second embodiment, a repeated explanation is not provided. The management database shown in FIG. 5 is recorded in the flash memory 305 in the wireless transmitter 300 in the second embodiment.

Figure 11:
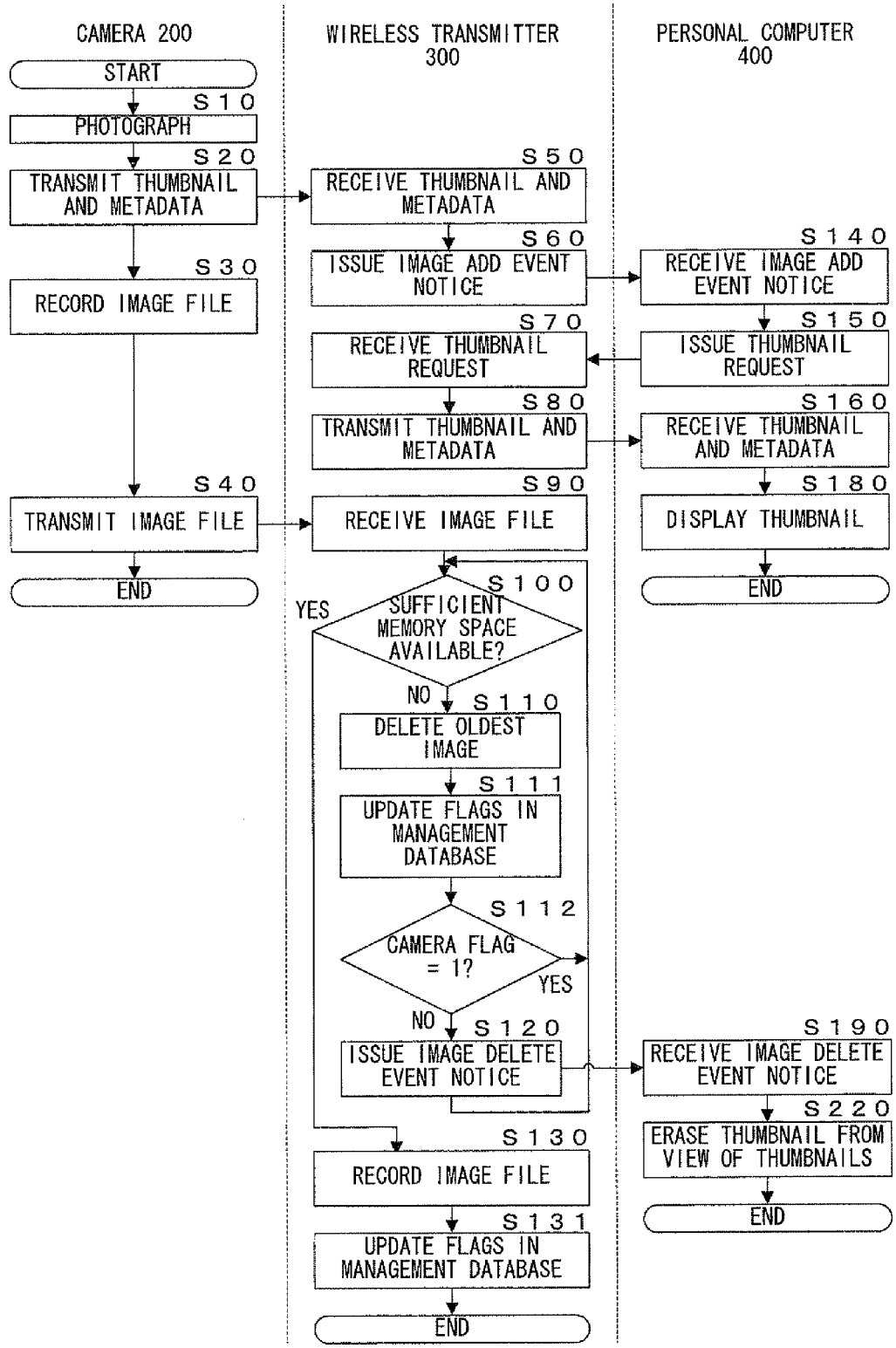
FIG. 11 presents a flowchart of the processing executed as an image is photographed with the camera 200 in a second embodiment.

FIG. 11 presents a flowchart of the processing executed in the camera 200, the wireless transmitter 300 and the personal computer 400 as an image is photographed with the camera 200. The processing shown in FIG. 11 starts as the user operates the shutter release button included in the operation member 209 at the camera 200. It is to be noted that in FIG. 11, steps in which processing similar to that executed in the first embodiment, as shown in FIG. 6 is executed, are assigned with the same step numbers and that the following explanation focuses on the differences from the processing shown in FIG. 6.

In step S111, the CPU 304 in the wireless transmitter 300 updates the flag settings recorded in the management database, which corresponds to the image data file with the oldest photographic date, having been deleted in step S110. More specifically, the CPU 304 adjusts the setting of the WT flag to 0 without altering the setting of the camera flag corresponding to the file name. The operation then proceeds to step S112.

In step S112, the CPU 304 references the management database to make a decision as to whether or not the setting of the camera flag corresponding to the image file, the WT flag setting of which has been adjusted to 0, is currently 1. If an affirmative decision is made, the operation returns to step S100. If, on the other hand, a negative decision is made, the operation proceeds to step S120. A negative decision is made if the image file is not recorded in the flash memory 305 in the wireless transmitter 300 or in the memory card 205 in the camera 200. Accordingly, the CPU 304 issues an image delete event notice to the personal computer 400 as a form of an erase instruction for erasing the thumbnail image corresponding to the image file from the view of thumbnail images at the monitor 408.

Upon receiving in step S190 the image delete event notice, the CPU 405 in the personal computer 400 erases the thumbnail image corresponding to the image file in relation to which the image delete event notice has been received from the view of thumbnail images at the monitor 408 in step S220, and then the processing ends.

Following step S130, in which the CPU 304 in the wireless transmitter 300 records the image file received from the camera 200 into the flash memory 305, the operation proceeds to step S131. In step S131, the CPU 304 registers the file name, the camera flag and the WT flag of the image file received from the camera 200 in the management database recorded in the flash memory 305 and then the processing ends. It is to be noted that the CPU 304 identifies the file name of the image file corresponding to the received image file by referencing the metadata recorded in the SDRAM 306 as explained earlier.

Figure 12:
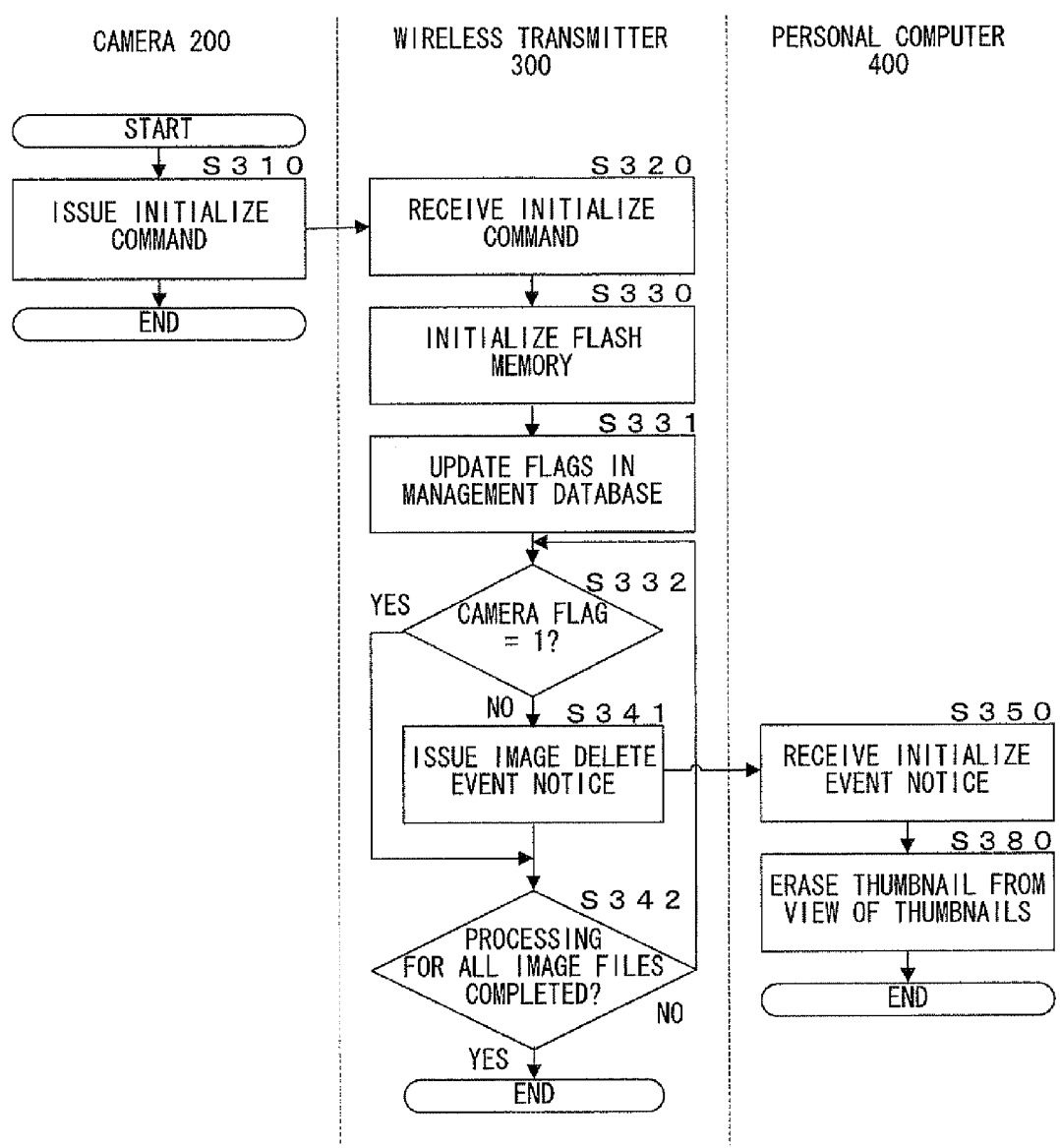
FIG. 12 presents a flowchart of the processing executed as the flash memory 305 in the wireless transmitter 300 is initialized in the second embodiment.

FIG. 12 presents a flowchart of the processing executed in the camera 200, the wireless transmitter 300 and the personal computer 400 as the flash memory 305 in the wireless transmitter 300 is initialized. The processing shown in FIG. 12 starts in response to an initialization instruction issued via the camera 200 by the user to initialize the flash memory 305. It is to be noted that in FIG. 12, steps in which processing similar to that executed in the first embodiment, as shown in FIG. 7 is executed, are assigned with the same step numbers and that the following explanation focuses on the differences from the processing shown in FIG. 7.

After the CPU 304 in the wireless transmitter 300 initializes the flash memory 305 in step S330, the operation proceeds to step S331. In step S331, the CPU 304 updates flag values in the management database. More specifically, it resets the settings of the WT flags corresponding to the file names of all the image files registered in the management database to 0. The operation then proceeds to step S332, in which the CPU 304 references the management database to make a decision as to whether or not the camera flag corresponding to a specific image file is currently set to 1.

If a negative decision is made, the operation proceeds to step S341. In this case, the particular image file is not recorded in the flash memory 305 in the wireless transmitter 300 or in the memory card 205a in the camera 200. Accordingly, the CPU 304 issues an image delete event notice to the personal computer 400 as a form of an erase instruction for erasing the thumbnail image corresponding to the image file from the view of thumbnail images at the monitor 408 and then the operation proceeds to step S342. If, on the other hand, an affirmative decision is made in step S332, the operation proceeds directly to step S342.

In step S342, the CPU 304 in the wireless transmitter 300 makes a decision as to whether or not the processing in steps S332 and S341 has been completed in correspondence to all the image files registered in the management database. If a negative decision is made, the operation returns to step S332 to repeatedly execute the processing. If, on the other hand, an affirmative decision is made, the processing ends.

In addition, upon receiving in step S350 the image delete event notice, the CPU 405 in the personal computer 400 erases the thumbnail image corresponding to the image file in relation to which the image delete event notice has been received from the view of thumbnail images at the monitor 408 in step S380, and then the processing ends.

Figure 13:
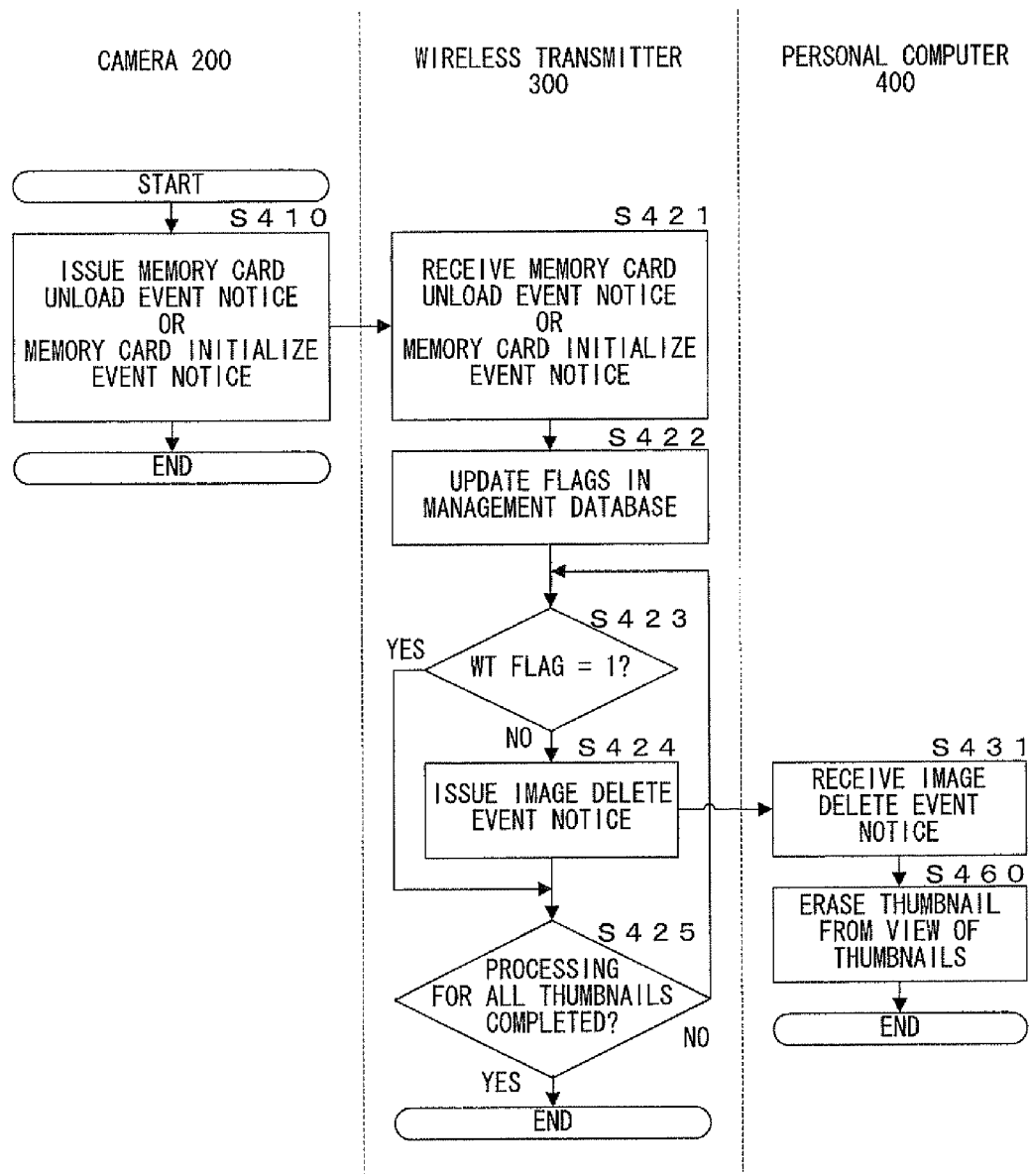
FIG. 13 presents a flowchart of the processing executed as a memory card 205a in the camera 200 is initialized or as the memory card 205a is unloaded from the memory card slot 205 in the second embodiment.

FIG. 13 presents a flowchart of the processing executed in the camera 200, the wireless transmitter 300 and the personal computer 400 as the memory card 205a in the camera 200 is initialized or as the memory card 205a is taken out of the memory card slot 205. The processing shown in FIG. 13 starts as the memory card 205a is initialized in response to an instruction issued by the user or as the user takes out the memory card 205a from the memory card slot 205. It is to be noted that in FIG. 13, steps in which processing similar to that executed in the first embodiment, as shown in FIG. 8 is executed, are assigned with the same step numbers and that the following explanation focuses on the differences from the processing shown in FIG. 8.

Upon receiving in step S421 the memory card unload event notice or the memory card initialize event notice, the CPU 304 in the wireless transmitter 300 updates flag values in the management database in step S422. More specifically, it resets the settings of the camera flags corresponding to the file names of all the image files registered in the management database to 0. The operation then proceeds to step S423, in which the CPU 304 references the management database to make a decision as to whether or not the WT flag corresponding to each image file is currently set to 1.

If a negative decision is made, the operation proceeds to step S424. In this case, the particular image file is not recorded in the flash memory 305 in the wireless transmitter 300 or in the memory card 205a in the camera 200 and accordingly, the CPU 304 issues an image delete event notice in relation to the particular image file to the personal computer 400 before the operation proceeds to step S425. If, on the other hand, an affirmative decision is made in step S423, the operation proceeds directly to step S425.

In step S425, the CPU 304 in the wireless transmitter 300 makes a decision as to whether or not the processing in steps S423 and S424 has been completed in correspondence to all the image files registered in the management database. If a negative decision is made, the operation returns to step S423 to repeatedly execute the processing. If, on the other hand, an affirmative decision is made, the processing ends.

Upon receiving the image delete event notice in step S431, the CPU 405 in the personal computer 400 erases the thumbnail image corresponding to the image file in relation to which the image delete event notice has been received from the view of thumbnail images at the monitor 408 in step S460 and then the processing ends.

Figure 14:
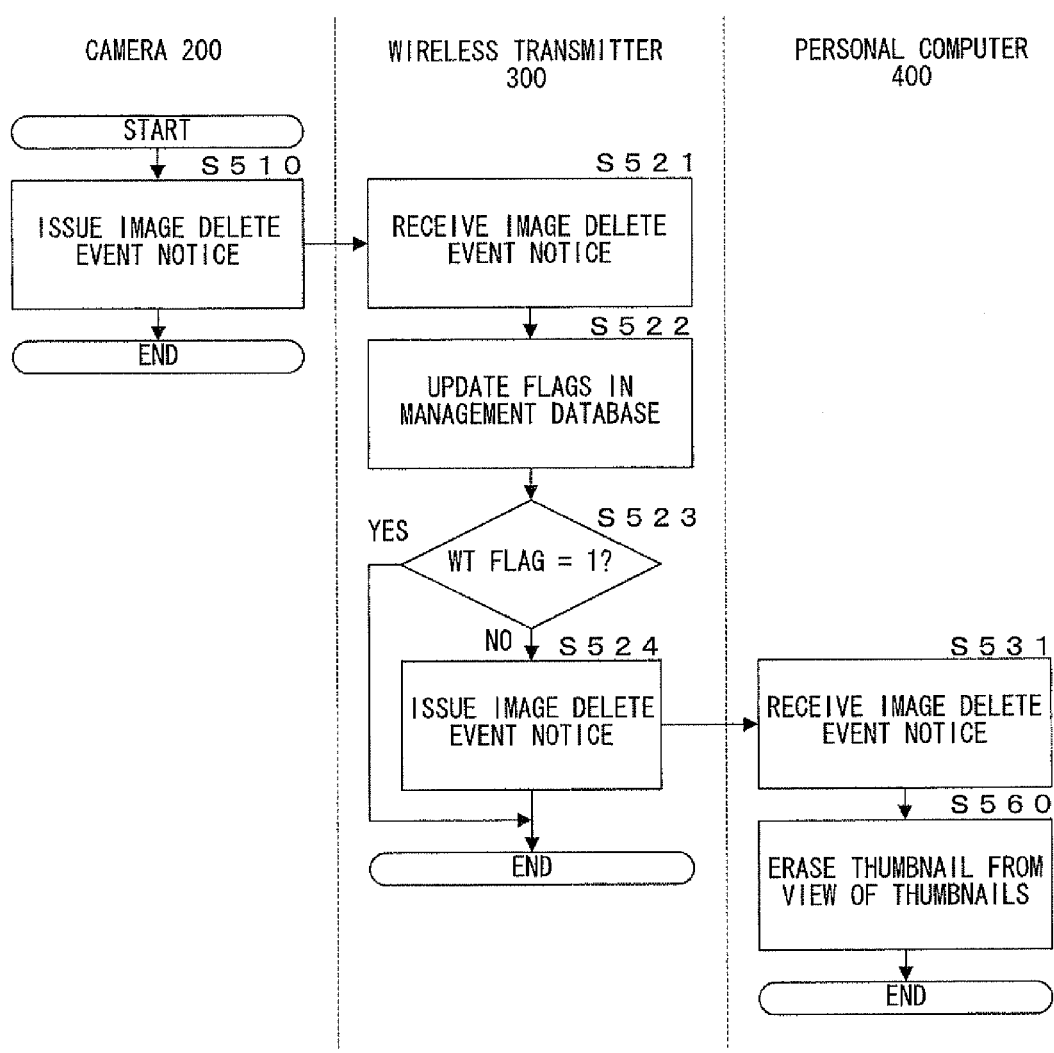
FIG. 14 presents a flowchart of the processing executed as one of the image files in the memory card 205a in the camera 200 is deleted in the second embodiment.

FIG. 14 presents a flowchart of the processing executed in the camera 200, the wireless transmitter 300 and the personal computer 400 as one of the image files in the memory card 205a in the camera 200 is deleted. The processing in FIG. 14 starts as a given image file is deleted from the memory card 205a in response to an instruction issued by the user. It is to be noted that in FIG. 14, steps in which processing similar to that executed in the first embodiment, as shown in FIG. 9 is executed, are assigned with the same step numbers and that the following explanation focuses on the differences from the processing shown in FIG. 9.

Upon receiving the image delete event notice from the camera 200 in step S521, the CPU 304 in the wireless transmitter 300 updates flag values in the management database in step S522. In more specific terms, it identifies the file name in the data registered in the management database, which matches the file name indicated in the image delete event notice and resets the setting of the camera flag corresponding to the file name to 0. Subsequently, the operation proceeds to step S523 in which the CPU 304 references the management database to make a decision as to whether or not the setting of the WT flag corresponding to the image file is currently 1.

If a negative decision is made, the operation proceeds to step S524. In this case, the particular image file is not recorded in the flash memory 305 in the wireless transmitter 300 or in the memory card 205a in the camera 200 and accordingly, the CPU 304 issues an image delete event notice with regard to the particular image file to the personal computer 400 and then ends the processing. If, on the other hand, an affirmative decision is made in step S523, the operation ends immediately.

Upon receiving the image delete event notice in step S531, the CPU 405 in the personal computer 400 erases the thumbnail image corresponding to the image file in relation to which the image delete event notice has been received from the view of thumbnail images at the monitor 408 in step S560 and then the processing ends.

Figure 15:
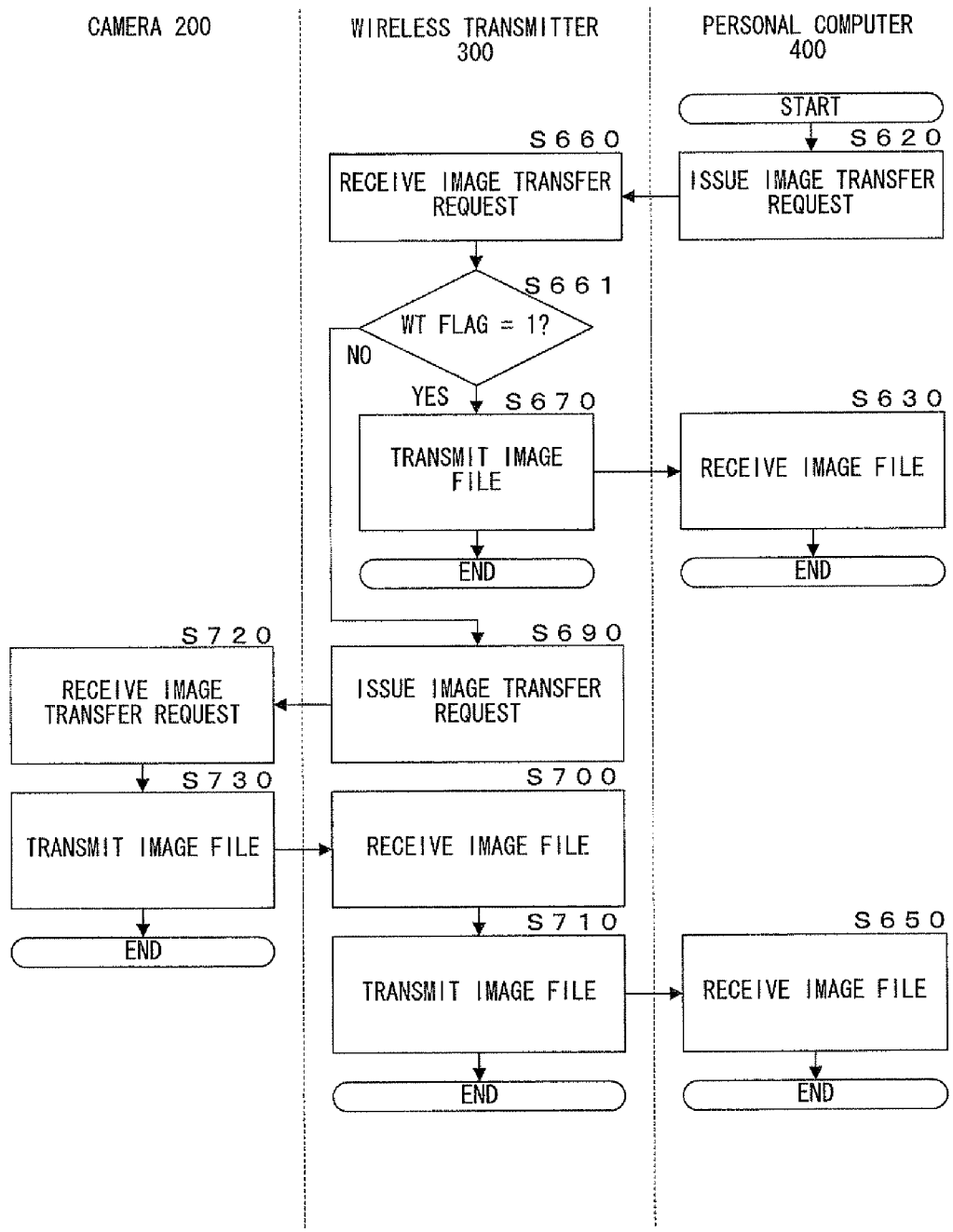
FIG. 15 presents a flowchart of the processing executed as the user issues an image file transfer request at the personal computer 400 in the second embodiment.

FIG. 15 presents a flowchart of the processing executed in the camera 200, the wireless transmitter 300 and the personal computer 400 as an image file transfer request is issued via the personal computer 400 by the user. The processing in FIG. 15 starts in response to an image file transfer request issued by the user via the personal computer 400. It is to be noted that in FIG. 15, steps in which processing similar to that executed in the first embodiment, as shown in FIG. 10 is executed, are assigned with the same step numbers and that the following explanation focuses on the differences from the processing shown in FIG. 10.

In response to the image file transfer request issued by the user, the CPU 405 in the personal computer 400 issues an image transfer request to the wireless transmitter 300 in step S620. Upon receiving the image transfer request from the personal computer 400 in step S660, the CPU 304 in the wireless transmitter 300 references the management database and makes a decision as to whether or not the WT flag corresponding to the file name assigned to the transfer target image file requested by the user is currently set to 1 in step S661.

If an affirmative decision is made, the operation proceeds to step S670. Since the requested image file is recorded in the flash memory 305, the CPU 304 reads out the requested image file from the flash memory 305 and transmits it to the personal computer 400 in step S670.

If, on the other hand, a negative decision is made in step S661, the operation proceeds to step S690. In this case, the requested image file is not recorded in the wireless transmitter 300 and accordingly, the CPU 304 issues an image transfer request to the camera 200. Then, in step S700, the CPU 304 receives the image file from the camera 200. It transmits the received image file to the personal computer 400 in step S710.

In addition to the advantages of the first embodiment, the following advantages are achieved through the second embodiment described above.

(1) Via the management database recorded in the flash memory 305 installed in the wireless transmitter 300, the recording status of each image file, i.e., whether or not the image file is recorded in the memory card 205a in the camera 200 and in the flash memory 305 in the wireless transmitter 300, is managed in the wireless transmitter 300. Upon receiving an image transfer request originating from the personal computer 400, the CPU 304 in the wireless transmitter 300 references the management database so as to make a decision as to whether or not the transfer target image file is recorded in the flash memory 305. If it is decided that the image file is recorded in the flash memory 305, the requested file is read out from the flash memory 305 and transmitted to the personal computer 400, whereas if it is decided that the image file is not recorded in the flash memory 305, the CPU 304 issues an image file transmission request to the camera 200 and transmits the image file received from the camera 200 to the personal computer 400. As a result, the recording location of the image file can be reliably managed by the wireless transmitter 300 and the CPU 304 is able to transmit the image file obtained from the optimal recording location to the personal computer 400.

(2) The CPU 405 in the personal computer 400 brings up at the monitor 408 a list display of thumbnail images received from the wireless transmitter 300. As an image file is deleted from the flash memory 305, the CPU 304 references the management database to make a decision as to whether or not an image file identical to the deleted image file is recorded in the memory card 205a. If it is decided that an image file identical to the deleted image file is not recorded in the memory card 205a, the CPU 304 issues an instruction for the personal computer 400 to erase the thumbnail image corresponding to the image file from the view of thumbnail images. In other words, the CPU 304 issues an instruction to erase from the thumbnail list the thumbnail image of the image file no longer available either from the camera 200 or the wireless transmitter 300. Consequently, a situation in which an image transfer request from the user for an image file no longer saved either into the camera 200 or at the wireless transmitter 300 is inadvertently issued does not arise.

(3) The CPU 304 updates the management database each time a new image file is added into the memory card 205a, each time a new image file is added into the flash memory 305, each time an image file is deleted from the memory card 205a, each time an image file is deleted from the flash memory 305, each time the flash memory 205a is initialized, each time the flash memory 305 is initialized and each time the memory card 205a is unloaded from the memory card slot 205 at the camera 200. The CPU 304 is thus able to keep itself up to date on the recording statuses of image files by updating the management database whenever the recording status of an image file in the memory card 205a or the flash memory 305 changes.

—Third Embodiment—

In reference to the third embodiment, processing is that may be executed to manage the management database at the camera 200 is described. It is to be noted that since the illustrations in FIGS. 1 through 4, in reference to which the first embodiment has been described, are also applicable to the second embodiment, a repeated explanation is not provided. The management database shown in FIG. 5 is recorded in the flash memory 207 in the camera 200 in the third embodiment.

Figure 16:
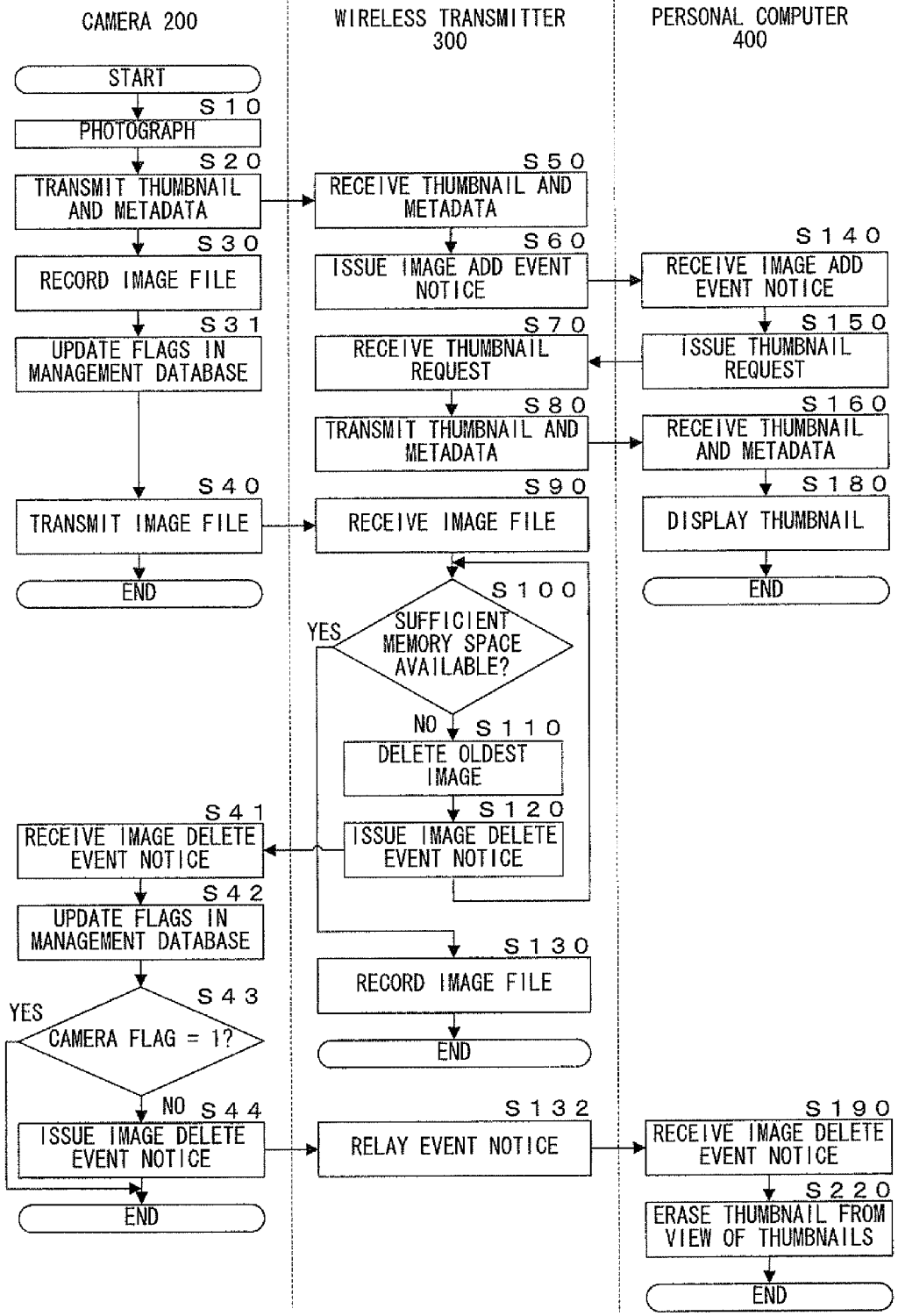
FIG. 16 presents a flowchart of the processing executed as an image is photographed with the camera 200 in a third embodiment.

FIG. 16 presents a flowchart of the processing executed in the camera 200, the wireless transmitter 300 and the personal computer 400 as an image is photographed with the camera 200. The processing shown in FIG. 16 starts as the user operates the shutter release button included in the operation member 209 at the camera 200. It is to be noted that in FIG. 16, steps in which processing similar to that executed in the first embodiment, as shown in FIG. 6 and that executed in the second embodiment, as shown in FIG. 11 is executed, are assigned with the same step numbers and that the following explanation focuses on the differences from the processing shown in FIGS. 6 and 11.

After recording the image file into the memory card 205a in step S30, the CPU 208 in the camera 200 registers information related to the recorded image file in the management database recorded in the flash memory 207 in step S31. In more specific terms, the CPU 208 registers the file name assigned to the image file and sets the camera flag and the WT flag corresponding to the file name to 1 in the management database shown in FIG. 5.

In addition, after deleting the image file with the oldest photographing date among the image files recorded in the flash memory 305 in step S110, the CPU 304 in the wireless transmitter 300 issues an image delete event notice to the camera 200 in step S120.

In step S41, the CPU 208 in the camera 200 receives the image delete event notice. In step S42, the CPU 208 updates the flag settings recorded in the management database, which correspond to the image data file having been deleted from the flash memory 305. More specifically, the CPU 208 adjusts the setting of the WT flag to 0 without altering the setting of the camera flag corresponding to the file name of the deleted image file. It is to be noted that in this embodiment too, the information indicating the file name of the deleted image file is included in the image delete event notice and the CPU 208 is thus able to identify the file name assigned to the image file having been deleted from the flash memory 305 based upon the information.

The operation then proceeds to step S43, in which the CPU 208 references the management database to make a decision as to whether or not the setting of the camera flag corresponding to the image file, the WT flag setting of which has been adjusted to 0, is currently 1. If a negative decision is made, the operation proceeds to step S44. A negative decision is made if the image file is not recorded in the flash memory 305 in the wireless transmitter 300 or in the memory card 205 in the camera 200. Accordingly, the CPU 208 issues an image delete event notice, intended for the personal computer 400 as the final recipient, to the wireless transmitter 300, before ending the processing.

The CPU 304 in the wireless transmitter 300 passes the image delete event notice received from the camera 200 on to the personal computer 400 in step S132. Upon receiving the image delete event notice in step S190, the CPU 405 in the personal computer 400 erases the thumbnail image corresponding to the image file from the view of thumbnail images at the monitor 408 in step S220 and then the processing ends.

Figure 17:
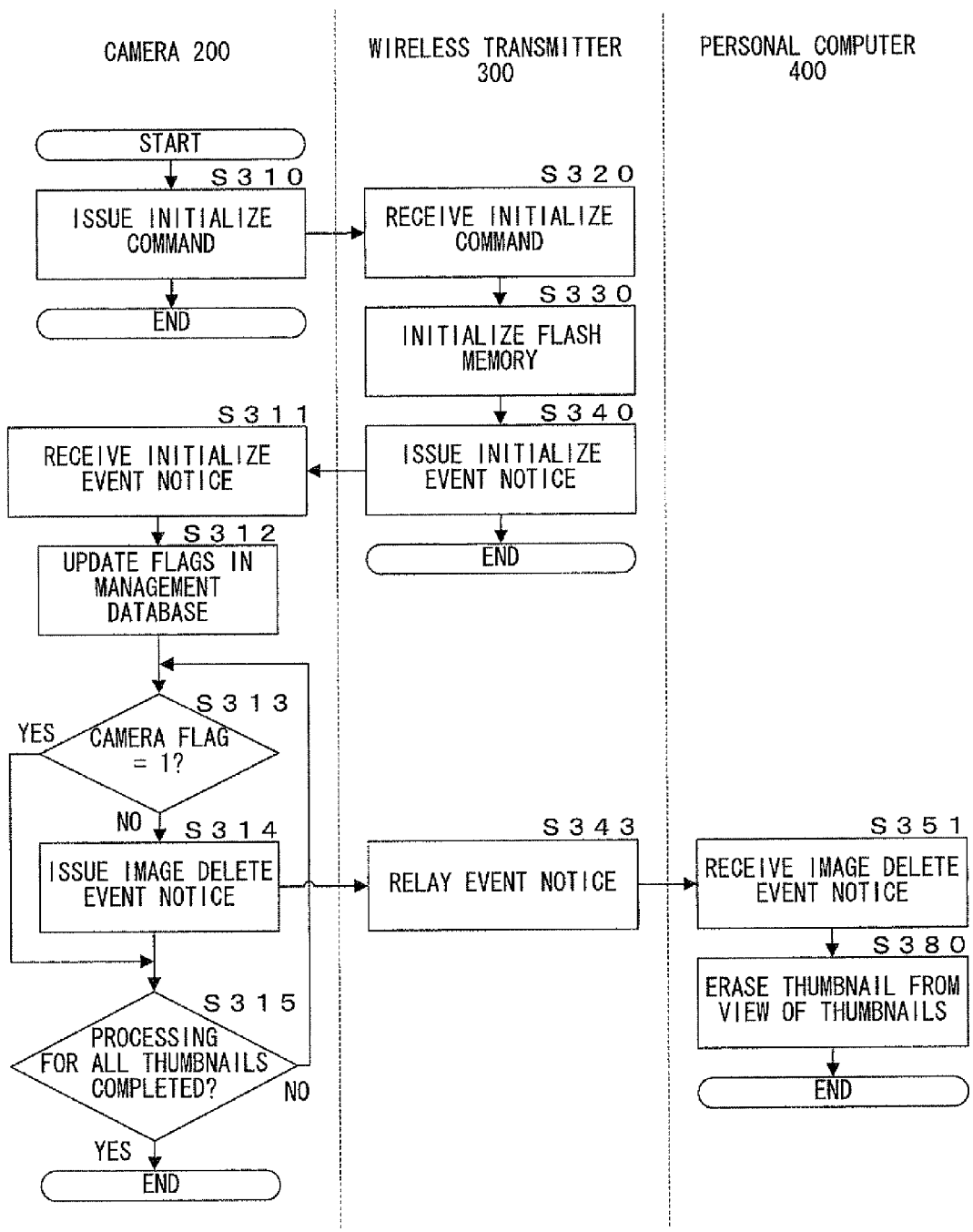
FIG. 17 presents a flowchart of the processing executed as the flash memory 305 in the wireless transmitter 300 is initialized in the third embodiment.

FIG. 17 presents a flowchart of the processing executed in the camera 200, the wireless transmitter 300 and the personal computer 400 as the flash memory 305 in the wireless transmitter 300 is initialized. The processing shown in FIG. 17 starts in response to an initialization instruction issued by the user via the camera 200 to initialize the flash memory 305. It is to be noted that in FIG. 17, steps in which processing similar to that executed in the first embodiment, as shown in FIG. 7 and that the processing executed in the second embodiment as shown in FIG. 12 is executed, are assigned with the same step numbers and that the following explanation focuses on the differences from the processing shown in FIGS. 7 and 12.

In step S340, the CPU 304 in the wireless transmitter 300 issues an initialize event notice to the camera 200. The CPU 208 in the camera 200 receives the initialize event notice in step S311. Then, in step S312, the CPU 208 updates flag values in the management database. In more specific terms, it resets the settings of the WT flags corresponding to the file names assigned to all the image files registered in the management database to 0. Subsequently, the operation proceeds to step S313 in which the CPU 208 makes a decision by referencing the management database as to whether or not the camera flag corresponding to a specific image file is currently set to 1.

If a negative decision is made, the operation proceeds to step S314. In this case, the particular image file is not recorded in the flash memory 305 in the wireless transmitter 300 or in the memory card 205a in the camera 200. Accordingly, the CPU 208 issues an image delete event notice intended for the personal computer 400 as the final recipient, to the wireless transmitter 300 and then the operation proceeds to step S315. If, on the other hand, an affirmative decision is made in step S313, the operation proceeds directly to step S315.

In step S315, a decision is made as to whether or not the processing in steps S313 and S314 has been completed in correspondence to all the image files registered in the management database. If a negative decision is made, the operation returns to step S313 to repeatedly execute the processing. If, on the other hand, an affirmative decision is made, the processing ends.

The CPU 304 in the wireless transmitter 300 passes the image delete event notice received from the camera 200 on to the personal computer 400 in step S343. Upon receiving the image delete event notice in step S351, the CPU 405 in the personal computer 400 erases the thumbnail image corresponding to the image file from the view of thumbnail images at the monitor 408 in step S380 and then the processing ends.

Figure 18:
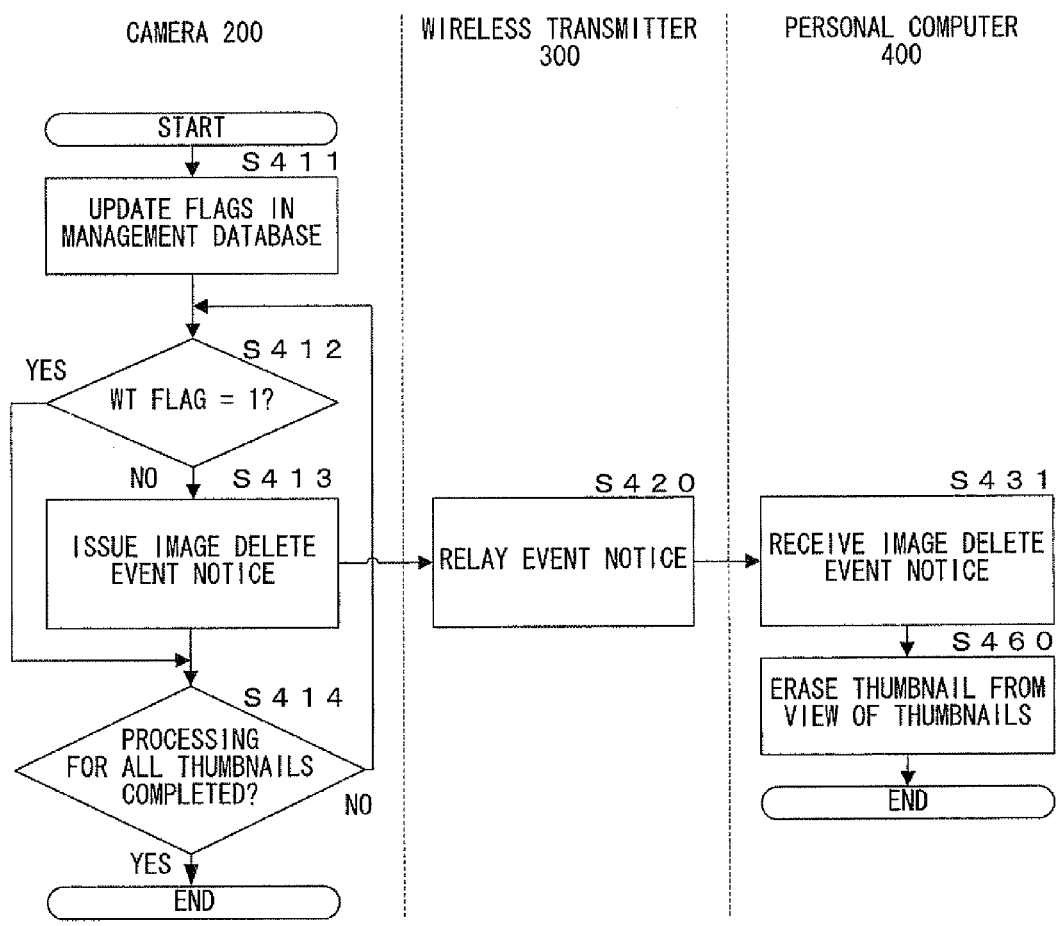
FIG. 18 presents a flowchart of the processing executed as a memory card 205a in the camera 200 is initialized or as the memory card 205a is unloaded from the memory card slot 205 in the third embodiment.

FIG. 18 presents a flowchart of the processing executed in the camera 200, the wireless transmitter 300 and the personal computer 400 as the memory card 205a in the camera 200 is initialized or as the memory card 205a is taken out of the memory card slot 205. The processing shown in FIG. 18 starts as the memory card 205a is initialized in response to an instruction issued by the user or as the user takes out the memory card 205a from the memory card slot 205. It is to be noted that in FIG. 18, steps in which processing similar to that executed in the first embodiment, as shown in FIG. 8 and that executed in the second embodiment as shown in FIG. 13 is executed, are assigned with the same step numbers and that the following explanation focuses on the differences from the processing shown in FIGS. 8 and 13.

In step S411, the CPU 208 in the camera 200 updates flag values in the management database recorded in the flash memory 207. More specifically, it resets the settings of the camera flags corresponding to the file names of all the image files registered in the management database to 0. The operation then proceeds to step S412, in which the CPU 208 references the management database to make a decision as to whether or not the WT flag corresponding to a specific image file is currently set to 1.

If a negative decision is made, the operation proceeds to step S413. In this case, the particular image file is not recorded in the flash memory 305 in the wireless transmitter 300 or in the memory card 205a in the camera 200. Accordingly, the CPU 208 issues an image delete event notice intended for the personal computer 400 as the final recipient, to the wireless transmitter 300. If, on the other hand, an affirmative decision is made in step S412, the operation proceeds directly to step S414.

In step S414, the CPU 208 makes a decision as to whether or not the processing in steps S412 and S413 has been completed in correspondence to all the image files registered in the management database. If a negative decision is made, the operation returns to step S412 to repeatedly execute the processing. If, on the other hand, an affirmative decision is made, the processing ends.

The CPU 304 in the wireless transmitter 300 passes the image delete event notice received from the camera 200 on to the personal computer 400 in step S420. Upon receiving the image delete event notice in step S431, the CPU 405 in the personal computer 400 erases the thumbnail image corresponding to the image file, in relation to which the image delete notice has been received, from the view of thumbnail images at the monitor 408 in step S460 and then the processing ends.

Figure 19:
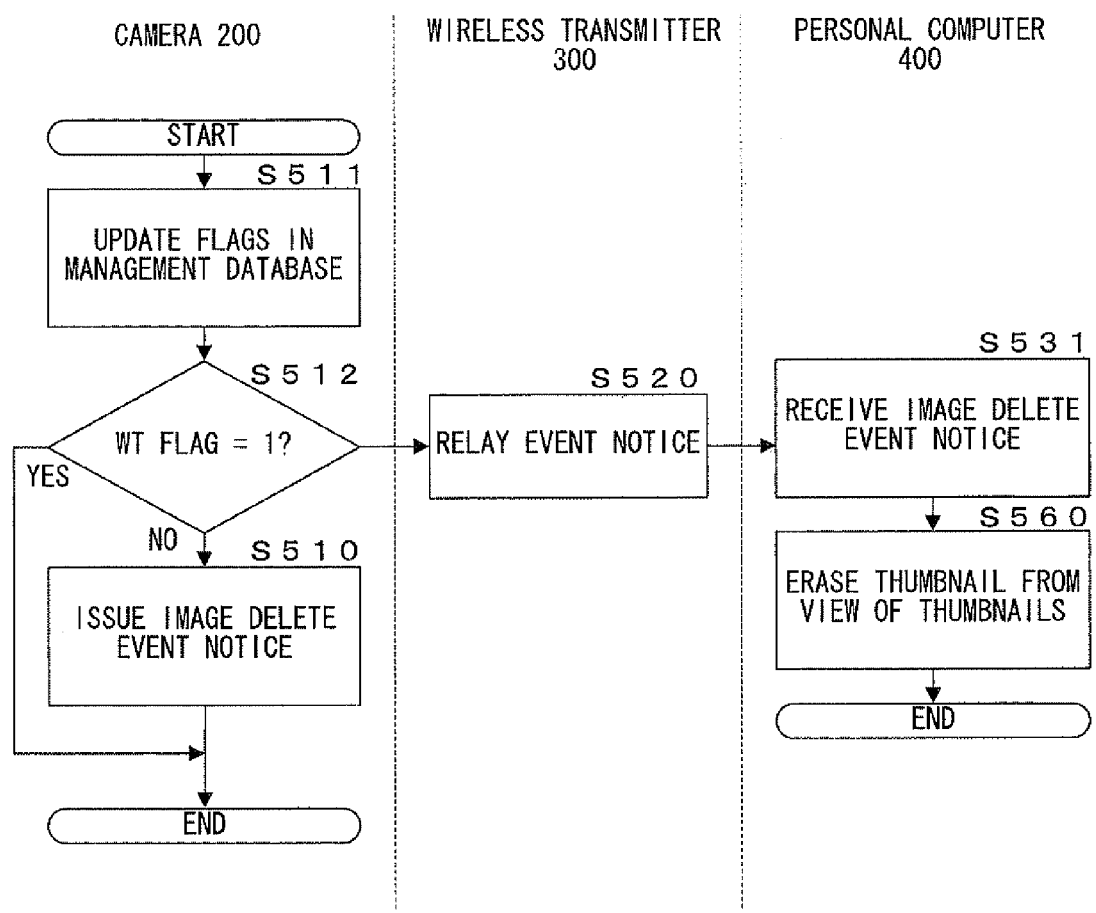
FIG. 19 presents a flowchart of the processing executed as one of the image files in the memory card 205a in the camera 200 is deleted in the third embodiment.

FIG. 19 presents a flowchart of the processing executed in the camera 200, the wireless transmitter 300 and the personal computer 400 as one of the image files in the memory card 205a in the camera 200 is deleted. The processing in FIG. 19 starts as a given image file is deleted from the memory card 205a in response to an instruction issued by the user. It is to be noted that in FIG. 19, steps in which processing similar to that executed in the first embodiment, as shown in FIG. 9 and that executed in the second embodiment as shown in FIG. 14 is executed, are assigned with the same step numbers and that the following explanation focuses on the differences from the processing shown in FIGS. 9 and 14.

In step S511, the CPU 208 in the camera 200 updates flag values in the management database recorded in the flash memory 207. In more specific terms, it updates the data registered in the management database by adjusting the setting of the camera flag corresponding to the file name assigned to the image file having been deleted from the memory card 250a to 0. Subsequently, the operation proceeds to step S512 in which the CPU 208 references the management database to make a decision as to whether or not the setting of the WT flag corresponding to the image file is currently 1.

If a negative decision is made, the operation proceeds to step S510 in which the CPU 208 issues an image delete event notice intended for the personal computer 400 as the final recipient, to the wireless transmitter 300, before ending the processing. If, on the other hand, an affirmative decision is made in step S512, the processing ends immediately.

The CPU 304 in the wireless transmitter 300 passes the image delete event notice received from the camera 200 on to the personal computer 400 in step S520. Upon receiving the image delete event notice in step S531, the CPU 405 in the personal computer 400 erases the thumbnail image corresponding to the image file, in relation to which the image delete event notice has been received, from the view of thumbnail images at the monitor 408 in step S560 and then the processing ends.

Figure 20:
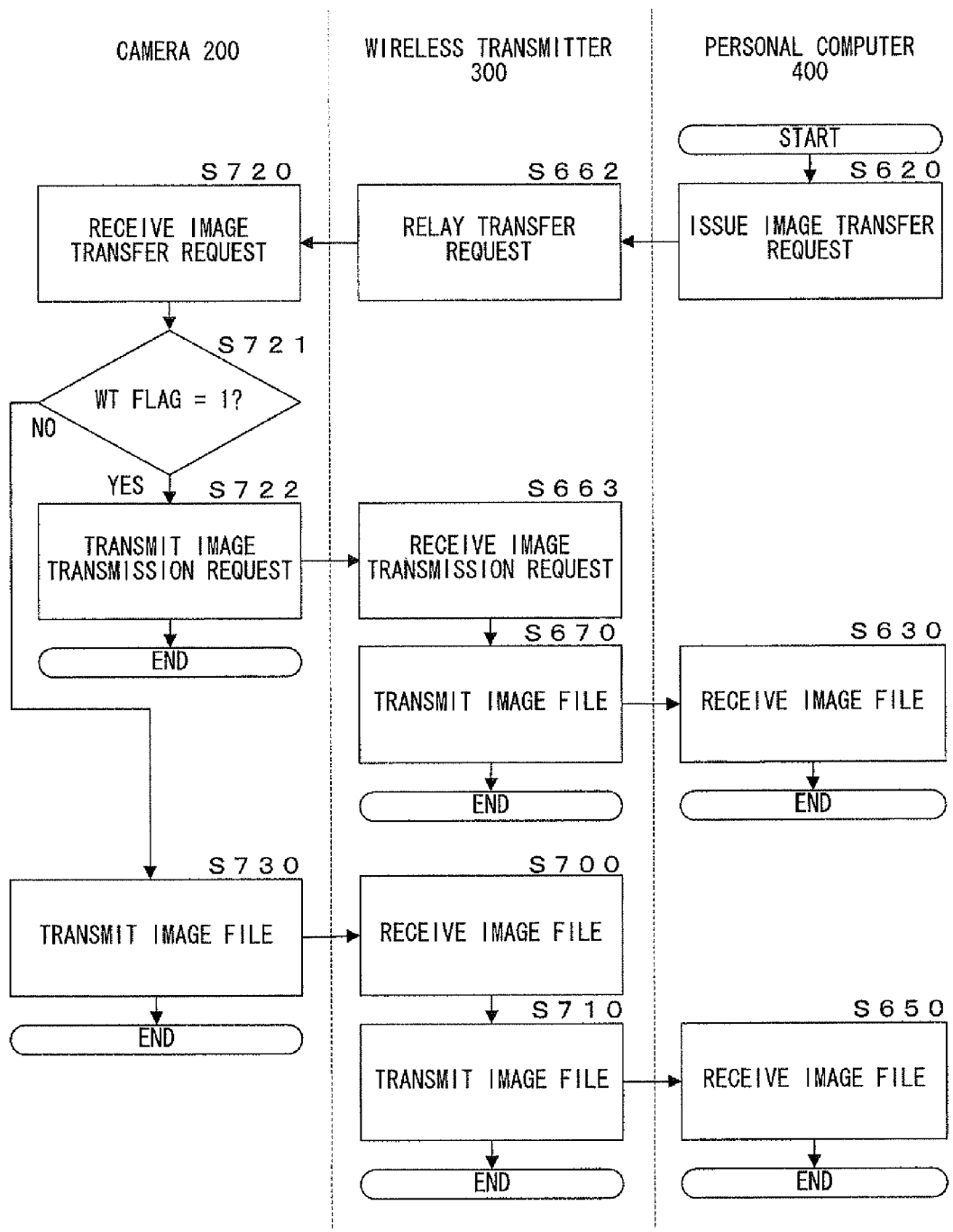
FIG. 20 presents a flowchart of the processing executed as the user issues an image file transfer request at the personal computer 400 in the third embodiment.

FIG. 20 presents a flowchart of the processing executed in the camera 200, the wireless transmitter 300 and the personal computer 400 as an image file transfer request is issued by the user via the personal computer 400. The processing in FIG. 20 starts in response to an image file transfer request issued by the user via the personal computer 400. It is to be noted that in FIG. 20, steps in which processing similar to that executed in the first embodiment, as shown in FIG. 10 and that executed in the second embodiment as shown in FIG. 15 is executed, are assigned with the same step numbers and that the following explanation focuses on the differences from the processing shown in FIGS. 10 and 15.

In response to the image file transfer request issued by the user, the CPU 405 in the personal computer 400 issues an image transfer request to the wireless transmitter 300 in step S620. The CPU 304 in the wireless transmitter 300 passes the image transfer request received from the personal computer 400 on to the camera 200 in step S662. Upon receiving the image transfer request in step S720, the CPU 208 in the camera 200 references the management database to make a decision as to whether or not the WT flag corresponding to the file name assigned to the requested image file is currently set to 1 in step S721.

If an affirmative decision is made, the operation proceeds to step S722, in which the CPU 208 transmits an image transmission request to the wireless transmitter 300 as a form of an instruction for transmitting the image file to the personal computer 400. Upon receiving the image transmission request from the camera 200 in step S663, the CPU 304 in the wireless transmitter 300 reads out the requested image file from the flash memory 305 and transmits the image file to the personal computer 400 in step S670.

If, on the other hand, a negative decision is made in step S721, the operation proceeds to step S730 in which the CPU 208 reads out the requested image file from the memory card 205a and transmits the requested image file to the wireless transmitter 300. Upon receiving the image file from the camera 200 in step S700, the CPU 304 transmits the received image file to the personal computer 400 in step S710.

In addition to the advantages of the first embodiment, the following advantages are achieved through the third embodiment described above.

(1) Via the management database recorded in the flash memory 207 installed in the camera 200, the recording status of each image file, i.e., whether or not the image file is recorded in the memory card 205a in the camera 200 and in the flash memory 305 in the camera 200, is managed in the camera 200. Upon receiving an image transfer request originating from the personal computer 400 via the wireless transmitter 300, the CPU 208 references the management database so as to make a decision as to whether or not the transfer target image file is recorded in the flash memory 305. If it is decided that the image file is recorded in the flash memory 305, an instruction for transmitting the requested file to the personal computer 400 is issued to the wireless transmitter 300, whereas if it is decided that the image file is not recorded in the flash memory 305, the requested file is read out from the memory card 205a and is transmitted to the wireless transmitter 300. As a result, the recording location of the image file can be reliably managed in the camera 200 and the CPU 208 is able to transmit the image file obtained from the optimal recording location to the personal computer 400.

(2) The CPU 405 in the personal computer 400 displays a view of thumbnail images at the monitor 408 of thumbnail images received from the wireless transmitter 300. As an image file is deleted from the memory card 205a, the CPU 208 references the management database to make a decision as to whether or not an image file identical to the deleted image file is recorded in the flash memory 305. If it is decided that an image file identical to the deleted image file is not recorded in the flash memory 305, the CPU 208 issues an instruction for the personal computer 400 to erase the thumbnail image corresponding to the image file from the list. In other words, the CPU 208 erases from the thumbnail list the thumbnail image of the image file no longer available either from the camera 200 or the wireless transmitter 300. Consequently, a situation in which an image transfer request from the user for an image file no longer saved either into the camera 200 or at the wireless transmitter 300 is inadvertently issued, does not arise.

(3) The CPU 208 updates the management database each time a new image file is added into the memory card 205a, each time a new image file is added into the flash memory 305, each time an image file is deleted from the memory card 205a, each time an image file is deleted from the flash memory 305, each time the flash memory 205a is initialized, each time the flash memory 305 is initialized and each time the memory card 205a is unloaded from the memory card slot 205 at the camera 200. The CPU 208 is thus able to keep itself up to date on the recording statuses of image files by updating the management database whenever the recording status of an image file in the memory card 205a or the flash memory 305 changes.

—Variations—

It is to be noted that the image transfer systems achieved in the embodiments described above allow for the following variations.

(1) In the first through third embodiments described above, each camera 200 is connected with a wireless transmitter 300 and the camera 200 is engaged in communication with the personal computer 400 via the wireless transmitter 300, as shown in FIG. 1. However, the camera 200 and the personal computer 400 may be directly connected with each other instead of via the wireless transmitter 300. In such a case, in response to an image transfer request from the user, the CPU 405 in the personal computer 400 should issue an image transfer request to the camera 200 and the CPU 208 in the camera 200 should read the transfer target image file having been requested from the memory card 205a and transmit it to the personal computer 400.

(2) In the first through third embodiments described above, the user issues a request for image file transfer via the personal computer 400 to obtain an image file recorded in the storage medium in the wireless transmitter 300. However, the present invention may be adopted in conjunction with an information device other than the personal computer 400, such as a server apparatus or a storage apparatus. Namely, a server apparatus or a storage apparatus adopting a structure such as that shown in FIG. 3 may be connected with wireless transmitters 300 through wired connection or wireless connection. Under such circumstances, the CPU in the server apparatus or the like should execute the processing executed by the personal computer 400 in FIGS. 6 through 20.

(3) In the first through third embodiments described above, each camera 200 is connected with a wireless transmitter 300 and camera 200 is engaged in communication with the personal computer 400 via the wireless transmitter 300 as shown in FIG. 1. However, the present invention may be adopted in conjunction with a storage apparatus where image files can be recorded in place of the camera 200. Namely, a storage apparatus may be connected with a wireless transmitter 300 so as to enable the storage apparatus to communicate with the personal computer 400 via the wireless transmitter 300.

(4) In the first through third embodiments described above, the CPU 208 in each camera 200 transmits thumbnail image data to the corresponding wireless transmitter 300 before recording the image file into the memory card 205a, so that the thumbnail image can be displayed promptly at the personal computer 400. Instead, the CPU 208 in the camera 200 may execute the processing for recording the image file into the memory card 205a and the processing for transmitting the thumbnail image data to the wireless transmitter 300 concurrently so as to display the thumbnail image shall be displayed promptly at the personal computer 400 promptly. If there is a discrepancy in the processing speed at which the image file is recorded into the memory card 205a and the processing speed at which the thumbnail image data are transmitted to the wireless transmitter 300, the CPU 208 may execute the concurrent processing by allocating processing capabilities corresponding to the discrepancy to the recording processing and the transmission processing.

(5) In the first through third embodiments described above, the CPU 208 in each camera 200 transmits thumbnail image data to the corresponding wireless transmitter 300 before recording the image file into the memory card 205a, so that the thumbnail image can be displayed promptly at the personal computer 400. Instead, the CPU 208 in the camera 200 may transmit the thumbnail image data to the wireless transmitter 300 after recording the image file into the memory card 205a so that the image file is recorded with priority.

(6) In the first through third embodiments described above, the CPU 208 in each camera 200 transmits metadata related to an image file to the wireless transmitter 300 together with the thumbnail image data corresponding to the image file. As an alternative, the CPU 208 may transmit only either the thumbnail image data or the metadata to the wireless transmitter 300. Assuming that the metadata alone are transmitted to the wireless transmitter 300, the CPU 405 in the personal computer 400 should bring up on display at the monitor 408 a list of the metadata corresponding to individual image files so as to enable the user to request a transfer of a specific image file by selecting the corresponding set of metadata in the list on display.

(7) In the first through third embodiments, the CPU 208 in each camera 200 transmits thumbnail image data to the wireless transmitter 300 so that the thumbnail image is displayed promptly at the personal computer 400 and also transmits an image delete event notice or the like so as to quickly erase a thumbnail image at the personal computer 400. Instead, the personal computer 400 may autonomously bring up a thumbnail image display and erase a thumbnail image, triggered by establishment of communication between the personal computer 400 and the wireless transmitter 300. In this case, the user does not need to perform any operation when, for instance, the communication is reestablished after a temporary communication failure, assuring a high level of convenience. An example of processing that may be autonomously executed by the computer 400 of to bring up a thumbnail image display and erase a thumbnail image as needed is now explained in reference to FIGS. 21 and 22.

Figure 21:
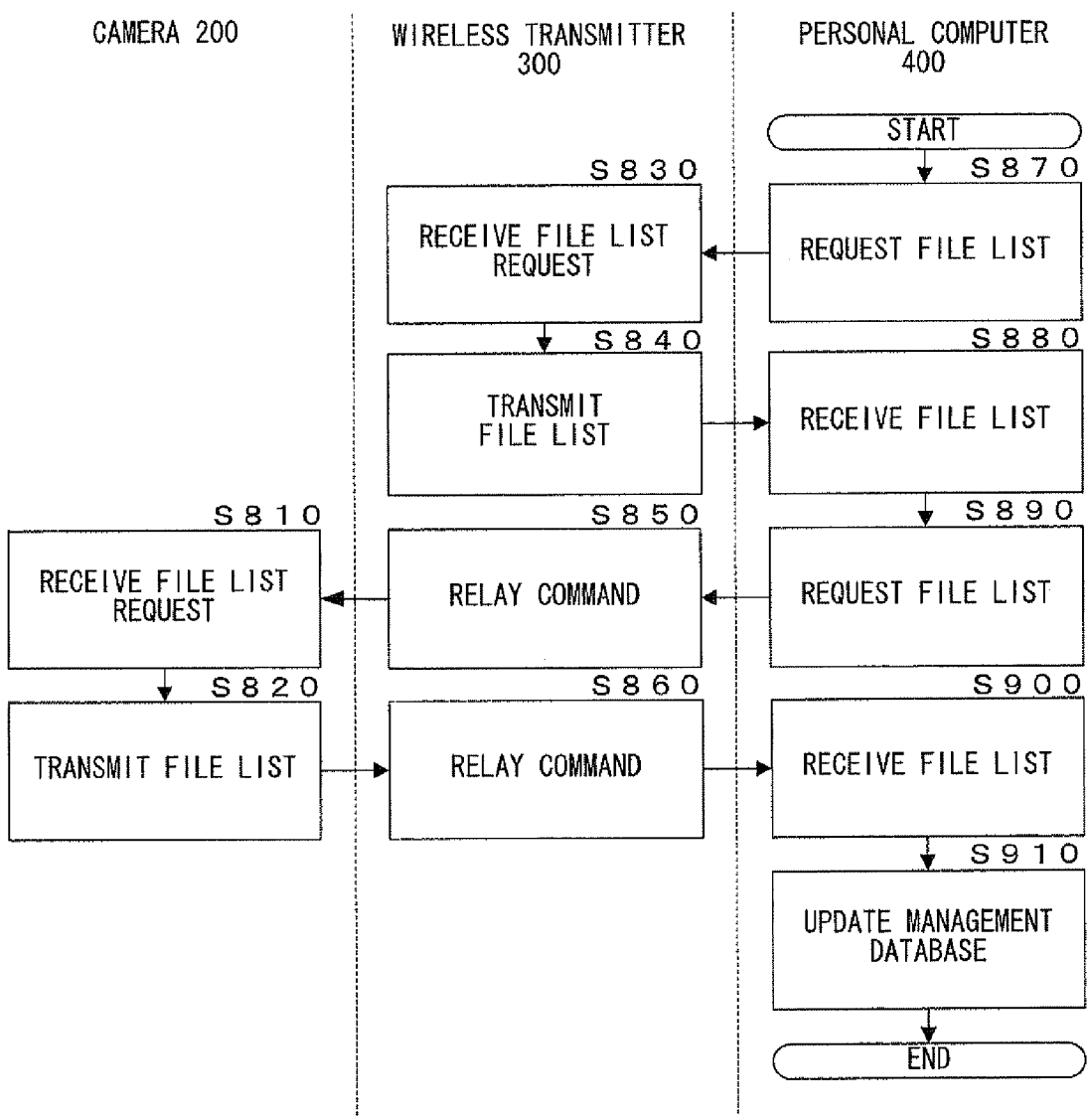
FIG. 21 presents a flowchart of the list data acquisition processing through which the personal computer 400 obtains list data listing the image files stored in the wireless transmitter 300 and in the camera 200, executed in a variation.

FIG. 21 presents a flowchart of the processing through which the personal computer 400 obtains list data listing the image files stored in the wireless transmitter 300 and the camera 200. The processing in FIG. 21 starts, triggered by establishment of communication between the personal computer 400 and the wireless transmitter 300.

In step S870, the CPU 405 in the personal computer 400 transmits an image file list data request to the CPU 304 in the wireless transmitter 300. Upon receiving the list data request in step S830, the CPU 304 transmits the image file list data to the CPU 405 in step S840 and the CPU 304 receives the list data in step S880. Next, the CPU 405 transmits an image file list data request to the CPU 208 in the camera 200 and receives the list data (steps S890, S850, S810, S820, S860 and S900). Based upon the list data having been obtained, the CPU 405 updates the management database in step S910, before the processing ends.

Figure 22:
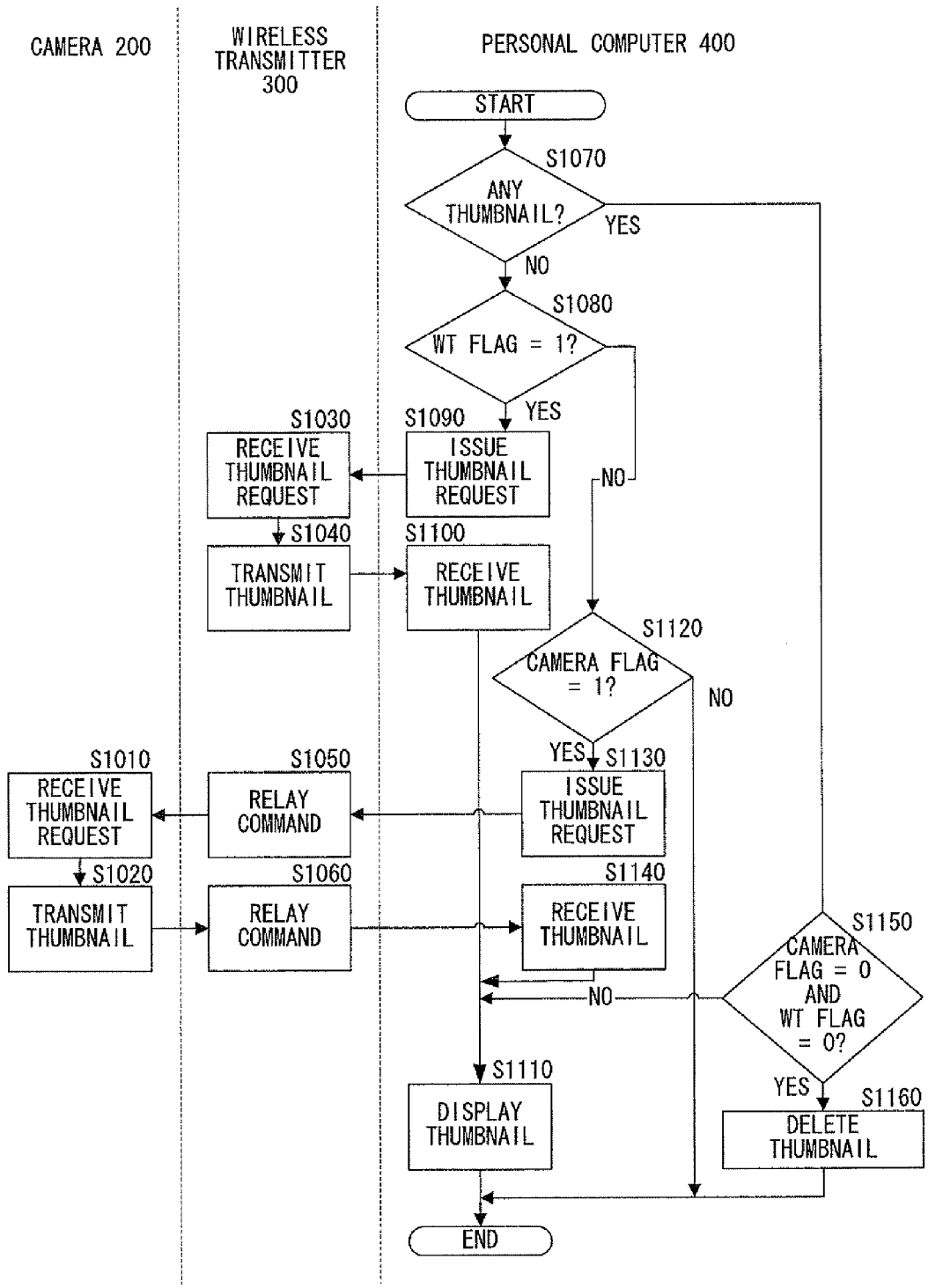
FIG. 22 presents a flowchart of the update processing executed by the CPU 405 in the personal computer 400 to update the thumbnail image display in the variation.

FIG. 22 presents a flowchart of the processing through which the CPU 405 in the personal computer 400 updates the thumbnail image display. The processing in FIG. 22 starts as the personal computer 400 ends the processing shown in FIG. 21.

In step S1070, the CPU 405 in the personal computer 400 makes a decision as to whether or not there is any thumbnail image. If an affirmative decision is made, the operation proceeds to step S1150 in which the CPU 405 makes a decision as to whether or not the corresponding camera flag and WT flag are both set to 0 by referencing the management database. If an affirmative decision is made, the operation proceeds to step S1160, in which the CPU 405 deletes the thumbnail image. However, if a negative decision is made, the operation proceeds to step S1110 to be detailed later.

If a negative decision is made in step S1070, the operation proceeds to step S1080. In step S1080, the CPU 405 makes a decision as to whether or not there is a WT flag set to 1. If an affirmative decision is made, the operation proceeds to step S1090, in which the CPU 405 transmits a thumbnail image request to the CPU 304 in the wireless transmitter 300 and receives the thumbnail image in step S1100 (steps S1090, S1030, S1040 and S1100).

If a negative decision is made in step S1080, the operation proceeds to step S1120. In step S1120, the CPU 405 makes a decision as to whether or not there is a camera flag set to 1. If an affirmative decision is made, the operation proceeds to step S1130, in which the CPU 405 transmits a thumbnail image request to the CPU 208 in the camera 200 and receives the thumbnail image in step S1140 (steps S1130, S1050, S1010, S1020, S1060 and S1140). After step S1140, or after making a negative decision in step S1150, the CPU 405 displays the thumbnail image at the monitor 408 in step S1110 before the processing ends. If a negative decision is made in step S1120, the processing ends immediately.

(8) The processing explained in reference to the first through third embodiments is executed while communication between the personal computer 400 and the wireless transmitter 300 continues. However, even while the communication between the personal computer 400 and the wireless transmitter 300 is discontinued, image files may be transmitted from the camera 200 to the wireless transmitter 300. Through such measures, prompt image file transfer is enabled after, for instance, the communication between the personal computer and the wireless transmitter is reestablished following a temporary communication failure and thus, a high level of convenience is assured. An example of standby processing that may be executed by the CPU 304 in the wireless transmitter 300 when the communication between the personal computer 400 and the wireless transmitter 300 is discontinued in the system described in reference to the first embodiment is now described in reference to FIGS. 23~25. It is to be noted that since the second and third embodiments differ from the first embodiment with regard only to the execution/non-execution of the management database update/reference processing, the standby processing may be adopted in the second and third embodiments as well in a manner similar to that adopted in conjunction with the first embodiment.

Figure 23:
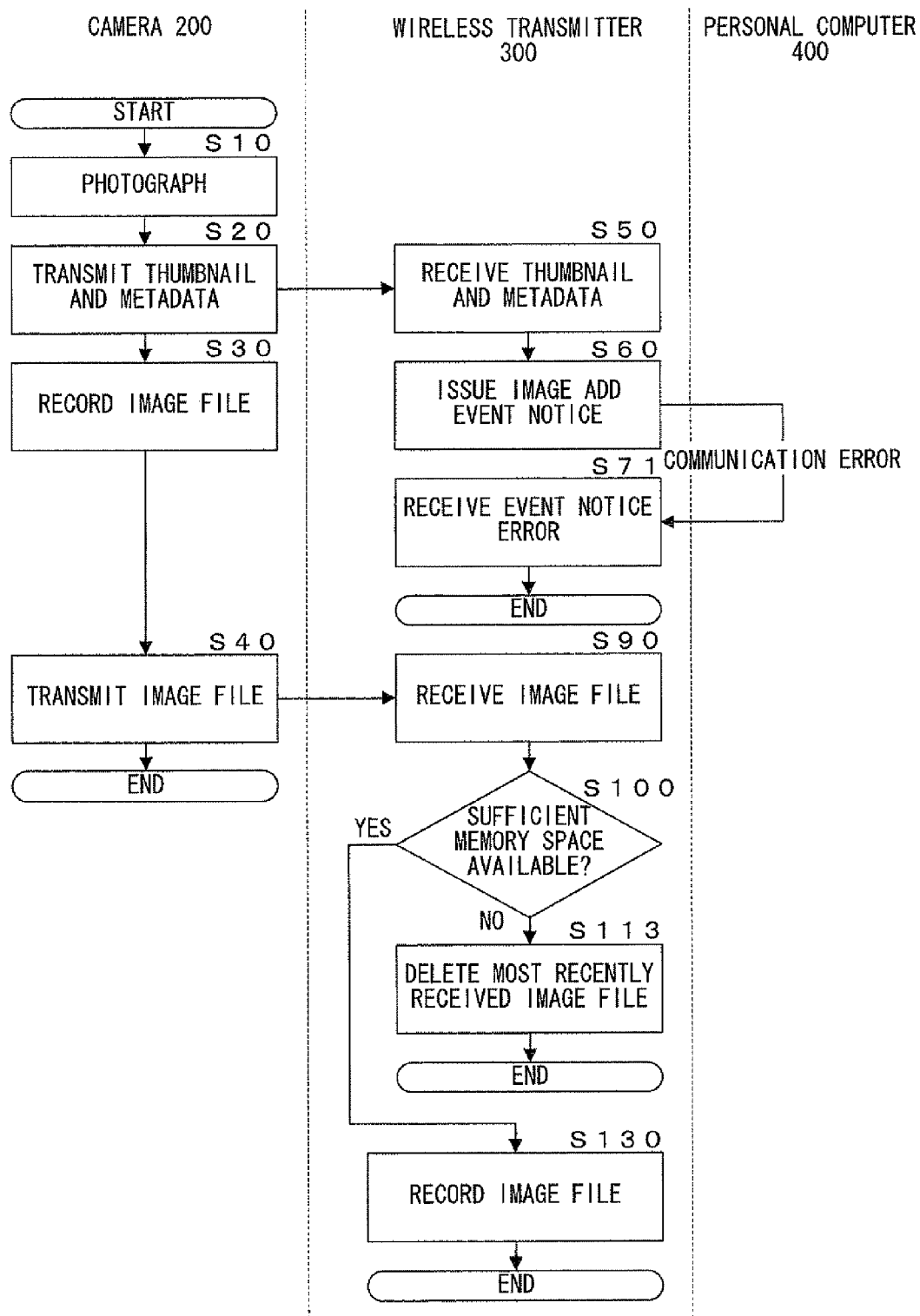
FIG. 23 presents a flowchart of the processing in a variation executed in the camera 200 and the wireless transmitter 300 in response to a photographing operation executed at the camera 200 while communication between the personal computer 400 and the wireless transmitter 300 is not established.

FIG. 23 presents a flowchart of the processing executed in the camera 200 and the wireless transmitter 300 in response to a photographing operation executed in the camera 200 while the communication between the personal computer 400 and the wireless transmitter 300 is discontinued. The processing in FIG. 23 starts as the user operates the shutter release button included in the operation member 209 at the camera 200. Since part of the processing shown in FIG. 23 is identical to part of the processing in FIG. 6, the following explanation focuses on steps in which processing different from that in FIG. 6 is executed.

If a communication error occurs with regard to the issuance of an image add event notice in step S60, the CPU 304 in the wireless transmitter 300 receives an event notice error in step S71 and the processing ends.

If a negative decision is made in step S100, the CPU 304 in the wireless transmitter 300 deletes the image file having been received from the camera 200 most recently in step S113, before the processing ends.

Figure 24:
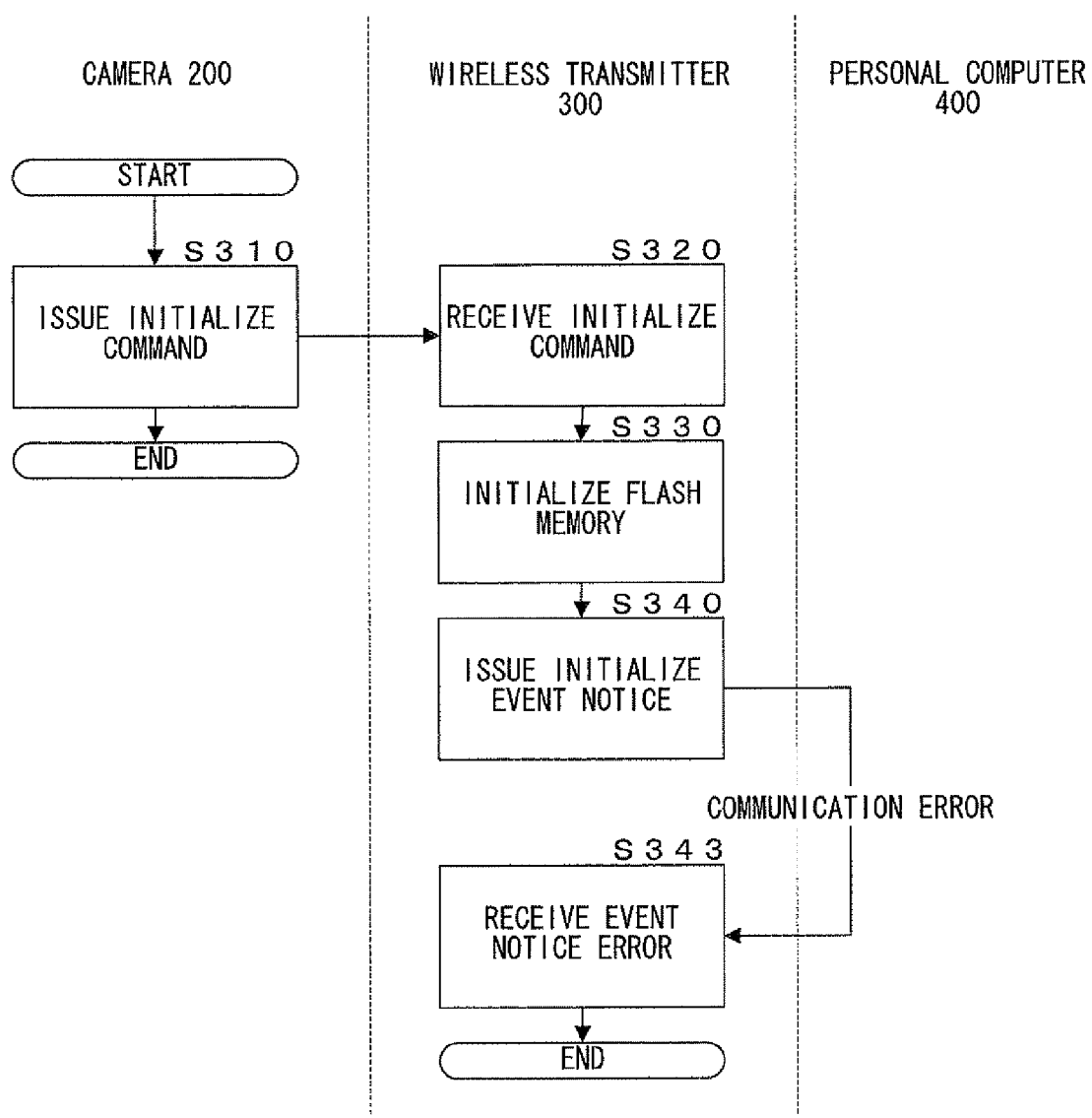
FIG. 24 presents a flowchart of the processing in a variation executed in the camera 200 and the wireless transmitter 300 in response to initialization of the flash memory 305 in the wireless transmitter 300 while communication between the personal computer 400 and the wireless transmitter 300 is not established.

FIG. 24 presents a flowchart of the processing executed in the camera 200 and wireless transmitter 300 as the flash memory 305 in the wireless transmitter 300 is initialized while the communication between the personal computer 400 and the wireless transmitter 300 is discontinued. It is to be noted that the user is able to issue an instruction to initialize the flash memory 305 by performing a specific menu operation at the camera 200. The processing in FIG. 24 starts in response to an instruction issued by the user via the camera 200 to initialize the flash memory 305. Since part of the processing shown in FIG. 24 is identical to part of the processing in FIG. 7, the following explanation focuses on steps in which processing different from that in FIG. 7 is executed.

If a communication error occurs in relation to the issuance of an initialize event notice in step S340, the CPU 304 in the wireless transmitter 300 receives an event notice error in step S343. Once the event error is received, there is no need to continue with the processing and accordingly, the processing ends.

Figure 25:
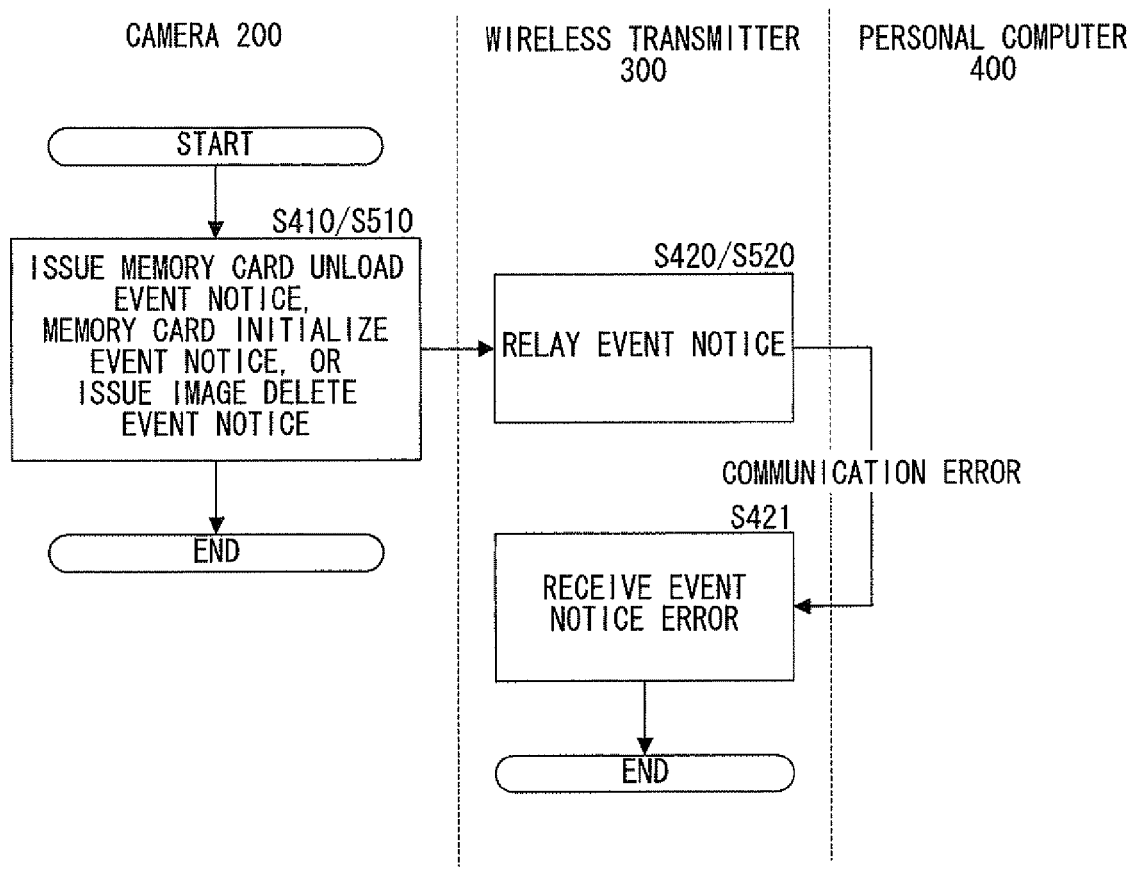
FIG. 25 presents a flowchart of the processing in a variation executed in the camera 200 and the wireless transmitter 300 in response to initialization of the memory card 205a in the camera 200, in response to disengagement of the memory card 205a from the memory card slot 205 at the camera 200 or in response to deletion of one of the image files in the memory card 205a in the camera 200 while communication between the personal computer 400 and the wireless transmitter 300 not established.

FIG. 25 presents a flowchart of the processing executed in the camera 200 and the wireless transmitter 300 if the memory card 205*a* in the camera 200 is initialized, the memory card 205*a* is taken out from the memory card slot 205 at the camera 200 or an image file is deleted from the memory card 205*a* in the camera 200 while the communication between the personal computer 400 and wireless transmitter 300 is discontinued. It is to be noted that the user is able to issue an instruction to initialize the memory card 205*a* by performing a specific menu operation at the camera 200. The processing shown in FIG. 25 starts as the memory card 205*a* is initialized in response to an instruction from the user, as the memory card 205*a* is taken out of the memory card slot 205 by the user or as an image file is deleted from the memory card 205*a* in response to an instruction issued by the user. Part of the processing executed in the CPU 304 at the wireless transmitter 300, as shown in FIG. 25, is identical to part of the processing shown in FIGS. 8 and 9. Since the processing executed in the CPU 208 at the camera 200 and in the CPU 304 at the wireless transmitter 300 is identical to the processing shown in FIGS. 8 and 9 except for that executed in steps S410 and S510, i.e., the first steps executed in the processing, the following explanation focuses on steps in FIG. 25 in which processing different from that shown in FIG. 8 is executed.

If a communication error occurs in relation to the event notice which the wireless transmitter has attempted to relay in step S420, the CPU 304 in the wireless transmitter 300 receives an event notice error in step S421. Once the event error is received, there is no need to continue the processing and thus, the processing ends.

(9) In reference to the first through third embodiments, processing executed while the communication between the personal computer 400 and the wireless transmitter 300 continues is described. An image file transfer request to the wireless transmitter 300 issued by the personal computer 400 while the communication between the personal computer 400 and the wireless transmitter 300 is discontinued, may be kept on hold in a request transmission queue. Since this enables a prompt image file transfer when the communication is reestablished following, for instance, a temporary communication failure without requiring the user to perform the same operation again, a higher level of convenience is assured. An example of standby processing that may be executed by the CPU 405 in the personal computer 400 when communication between the personal computer 400 and the wireless transmitter 300 is discontinued in the system described in reference to the first embodiment is now described in reference to FIG. 26. It is to be noted that since the second and third embodiments differ from the first embodiment with regard to the execution/non-execution of the management database reference processing, the standby processing may be adopted in the second and third embodiments as well in a manner similar to that adopted in conjunction with the first embodiment.

Figure 26:
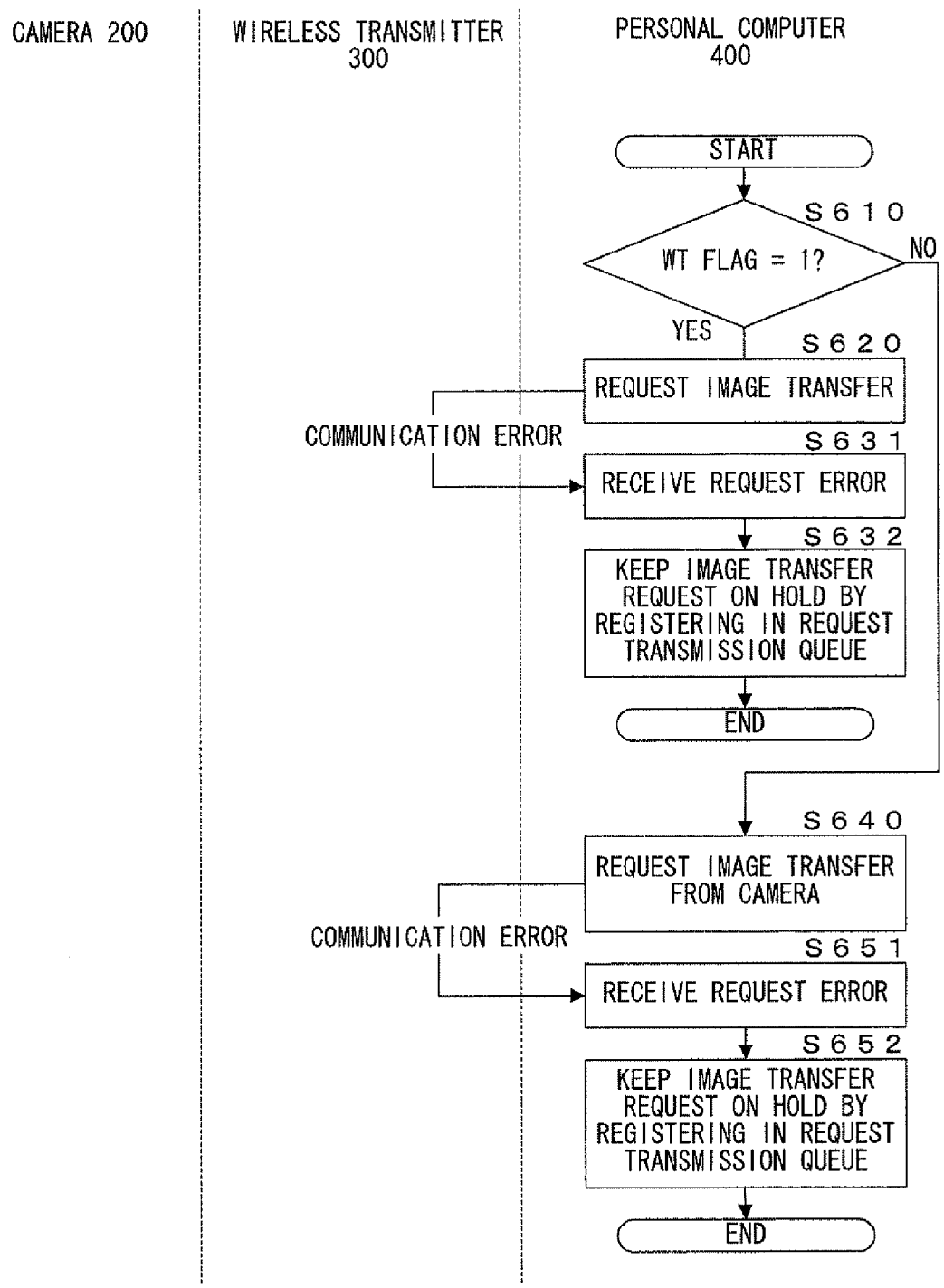
FIG. 26 presents a flowchart of the processing executed in a variation in the personal computer 400 in response to a photographing operation executed at the camera 200 while communication between the personal computer 400 and the wireless transmitter 300 is not established.

FIG. 26 presents a flowchart of the processing executed in the personal computer 400 in response to a photographing operation executed in the camera 200 while the communication between the personal computer 400 and the wireless transmitter 300 is discontinued. The processing shown in FIG. 26 starts in response to an image file transfer request issued by the user by selecting via the operation member 401 at the personal computer 400 a specific thumbnail image in the view of thumbnail images at the monitor 408 of the personal computer 400. Since part of the processing shown in FIG. 26 is identical to part of the processing in FIG. 10, the following explanation focuses on steps in which processing different from that in FIG. 10 is executed.

If a communication error occurs in relation to the image transfer request to the CPU 304 in the wireless transmitter 300 issued in step S620, the CPU 405 in the personal computer 400 receives a request error in step S631. In step S632, the CPU 405 registers the image transfer request having resulted in a transmission error into a request transmission queue in the CPU 405 so as to keep the image transfer request on hold, before ending the processing.

If a communication error occurs in relation to the image transfer request to the CPU 208 in the camera 200 issued in step S640, the CPU 405 receives a request error in step S651. In step S652, the CPU 405 registers the image transfer request having resulted in a transmission error into the request transmission queue in the CPU 405 so as to keep the image transfer request on hold, before ending the processing.

Figure 27:
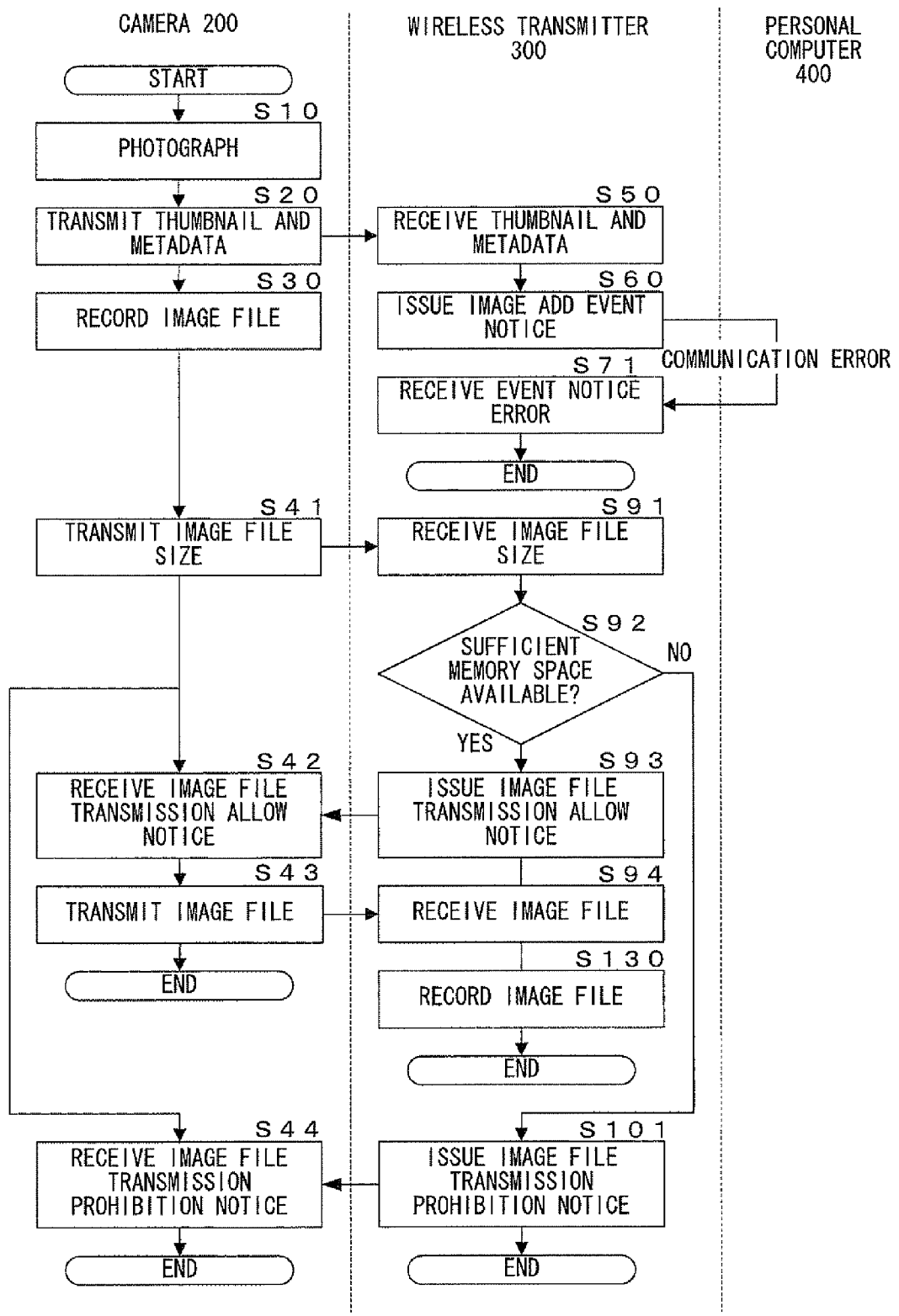
FIG. 27 presents a flowchart of the processing executed in the camera 200 and the wireless transmitter 300 in response to a photographing operation executed at the camera 200 while communication between the personal computer 400 and the wireless transmitter 300 is not established.

(10) In variation (8) described above, the CPU 304 in the wireless transmitter 300 makes a decision as to whether or not sufficient memory space is available in the flash memory 305 for recording the image file received from the camera 200. Instead, the CPU 304 may receive information in advance that indicates the size of the image file to be transmitted from the camera 200 and make a decision in advance as to whether or not the flash memory 305 has sufficient memory space available for recording the image file received from the camera 200 based upon the image file size. More specifically, the processing shown in FIG. 23 may be modified as shown in FIG. 27. In this way, an image file transmitted from the camera 200 shall be saved into the wireless transmitter 300 with a high level of reliability and thus, a high level of convenience is assured by preventing an inadvertent image file loss.

FIG. 27 presents a flowchart of the processing executed in the camera 200 and the wireless transmitter 300 in response to a photographing operation executed in the camera 200 while the communication between the personal computer 400 and the wireless transmitter 300 is discontinued. The processing in FIG. 27 starts as the user operates the shutter release button included in the operation member 209 at the camera 200. Since part of the processing shown in FIG. 27 is identical to part of the processing in FIG. 23, the following explanation focuses on steps in which processing different from that in FIG. 23 is executed.

Before transmitting the image file, the CPU 208 in the camera 200 transmits the information indicating the file size of the image file to the wireless transmitter 300 in step S41. Upon receiving in step S91 the information indicating the image file size, the CPU 304 in the wireless transmitter 300 makes a decision in step S92 based upon the file size whether or not the flash memory 305 currently has sufficient memory space available for recording the image file.

If a negative decision is made in step S92, the CPU 304 in the wireless transmitter 300 issues an image file transmission prohibition notice to the camera 200 in step S101 before the processing ends. Upon receiving in step S44 the image file transmission prohibition notice, the CPU 208 in the camera 200 ends the processing.

If an affirmative decision is made in step S92, the CPU 304 in the wireless transmitter 300 issues an image file transmission allow notice to the camera 200 in step S93. Upon receiving in step S42 the image file transmission allow notice, the CPU 208 in the camera 200 transmits the image file to the CPU 304 in the wireless transmitter 300 in step S43 before ending the processing.

Upon receiving the image file in step S94, the CPU 304 in the wireless transmitter 300 executes the processing in step S130 as described earlier, before ending the processing.

The above described embodiments are examples, and various modifications can be made without departing from the scope of the invention.

What is claimed is:

1. An image saving apparatus in an image transfer system configured with an image transmission apparatus, an image transfer apparatus and the image saving apparatus, wherein:
   the image transmission apparatus transmits image data recorded in a storage medium to the image transfer apparatus, the image transfer apparatus receives the image data transmitted from the image transmission apparatus, records the image data which the image transfer apparatus has received into a first storage device and transfers the image data which the image transfer apparatus has recorded to the image saving apparatus in response to an image transfer request issued from the image saving apparatus, and the image saving apparatus receives the image data transferred from the image transfer apparatus and records the image data into a second storage device; and
   the image saving apparatus, comprising:
   the second storage device;
   a communication unit engaged in communication with the image transfer apparatus;
   a recording control unit for controlling read and write at the second storage device of management information indicating whether or not the image data is recorded in each of the storage medium and in the first storage device;
   a request receiving unit for receiving an image acquisition request for target image data among the image data from a user;
   a decision-making unit for making a decision as to whether or not the target image data are recorded in the first storage device by referencing the management information read via the recording control unit;
   an image requesting unit for issuing a first transmission request, as the image transfer request, for the target image data to the image transfer apparatus via the communication unit if the decision-making unit determines that the target image data are recorded in the first storage device, and issuing a second transmission request, as the image transfer request, for the target image data to the image transmission apparatus via the image transfer apparatus engaged in communication with the communication unit if the decision-making unit determines that the target image data are not recorded in the first storage device; and
   an image recording unit for recording the target image data received via the communication unit based upon the first request and the second request issued by the image requesting unit into the second storage device.

* * * * *